United States Patent
Kumagai et al.

(10) Patent No.: US 7,986,343 B2
(45) Date of Patent: Jul. 26, 2011

(54) MULTI-EYE IMAGING APPARATUS

(75) Inventors: Hironori Kumagai, Osaka (JP); Taku Hirasawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 10/597,794

(22) PCT Filed: Dec. 12, 2005

(86) PCT No.: PCT/JP2005/022751
§ 371 (c)(1),
(2), (4) Date: Aug. 8, 2006

(87) PCT Pub. No.: WO2006/064751
PCT Pub. Date: Jun. 22, 2006

(65) Prior Publication Data
US 2007/0159535 A1   Jul. 12, 2007

(30) Foreign Application Priority Data

Dec. 16, 2004 (JP) ................................. 2004-363868
May 26, 2005 (JP) ................................. 2005-154447

(51) Int. Cl.
H04N 5/228 (2006.01)
H04N 5/225 (2006.01)
G03B 17/00 (2006.01)

(52) U.S. Cl. ........... 348/208.13; 348/208.99; 348/208.1; 348/208.2; 348/218.1; 348/222.1; 396/52; 396/54; 396/55

(58) Field of Classification Search ............... 348/218.1, 348/208.13; 396/52–54
See application file for complete search history.

(56) References Cited

U.S. PATENT DOCUMENTS

| 6,429,895 | B1 |   | 8/2002  | Onuki |
|-----------|----|---|---------|-------|
| 6,466,253 | B1 |   | 10/2002 | Honjoh |
| 6,611,289 | B1 | * | 8/2003  | Yu et al. ........................ 348/265 |
| 7,095,001 | B2 | * | 8/2006  | Kawahara .................. 250/201.2 |
| 7,123,298 | B2 | * | 10/2006 | Schroeder et al. ............ 348/273 |
| 7,162,151 | B2 | * | 1/2007  | Nonaka et al. .................. 396/52 |
| 7,456,874 | B1 | * | 11/2008 | Ono ............................. 348/239 |
| 7,463,284 | B2 | * | 12/2008 | Tamamura ................ 348/208.1 |
| 2002/0122124 | A1 |   | 9/2002 | Suda |
| 2003/0071905 | A1 | * | 4/2003 | Yamasaki .................... 348/239 |
| 2005/0175257 | A1 |   | 8/2005 | Kuroki |
| 2005/0280714 | A1 | * | 12/2005 | Freeman .................... 348/219.1 |
| 2006/0127084 | A1 | * | 6/2006  | Okada ........................... 396/439 |
| 2006/0132612 | A1 | * | 6/2006  | Kawahara ................ 348/208.6 |

FOREIGN PATENT DOCUMENTS

| JP | 6-261236 | 9/1994 |
| JP | 10-191135 | 7/1998 |
| JP | 11-225284 | 8/1999 |

(Continued)

*Primary Examiner* — Jason Chan
*Assistant Examiner* — Michael Osinski
(74) *Attorney, Agent, or Firm* — Hamre, Schumann, Mueller & Larson, P.C.

(57) ABSTRACT

A multi-eye imaging apparatus comprises a plurality of imaging systems (106a, 106b) each including an optical system (107a, 107b) and an imaging element (108a, 108b) and having a different optical axis. The plurality of imaging systems (106a, 106b) include a first imaging system (106b) having a pixel shift means (101) for changing a relative positional relationship between an image formed on the imaging element (108b), and the imaging element (108b), and a second imaging system (106a) in which a relative positional relationship between an image formed on the imaging element (108a), and the imaging element (108a), is fixed during time-series image capture.

6 Claims, 19 Drawing Sheets

FOREIGN PATENT DOCUMENTS

| | | | |
|---|---|---|---|
| JP | 2001-12927 | | 1/2001 |
| JP | 2001012927 | * | 1/2001 |
| JP | 2003-134385 | | 5/2003 |
| JP | 2003134385 | * | 5/2003 |
| JP | 2004-318853 | | 11/2004 |
| JP | 2005-176040 | | 6/2005 |

* cited by examiner

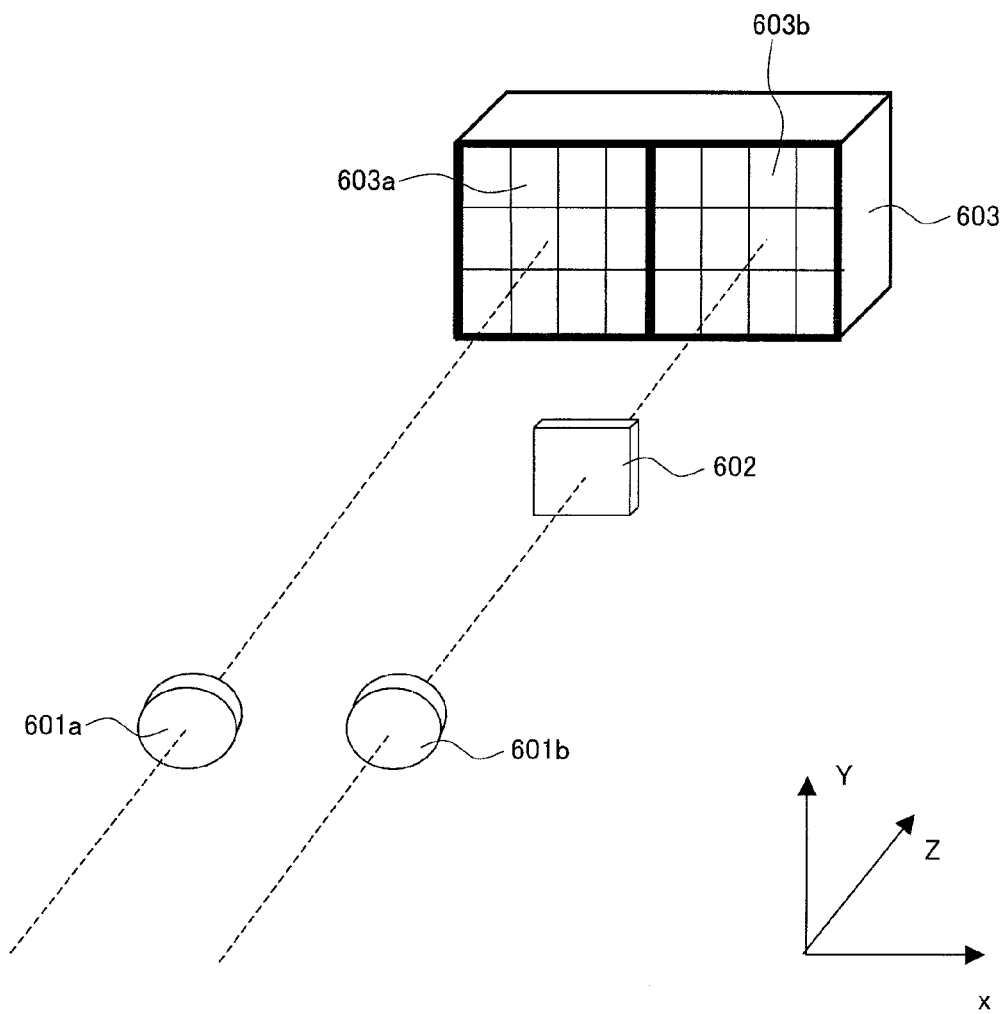
F I G. 6

| Imaging region | X coordinate of subject | $\Delta = 0$ $bx = 0$ | $\Delta = 0$ $bx = 0.5$ | $\Delta = 0.5$ $bx = 0$ | $\Delta = 0.5$ $bx = 0.5$ |
|---|---|---|---|---|---|
| 1000a | ax | 0 | 0 | 0 | 0 |
| 1000b | ax+$\Delta$ | 0 | 0 | 0.5 | 0.5 |
| 1002a | ax+bx | 0 | 0.5 | 0 | 0.5 |
| 1002b | ax+bx+$\Delta$−0.5 | 0.5 | 0 | 0 | 0.5 |

FIG. 13A
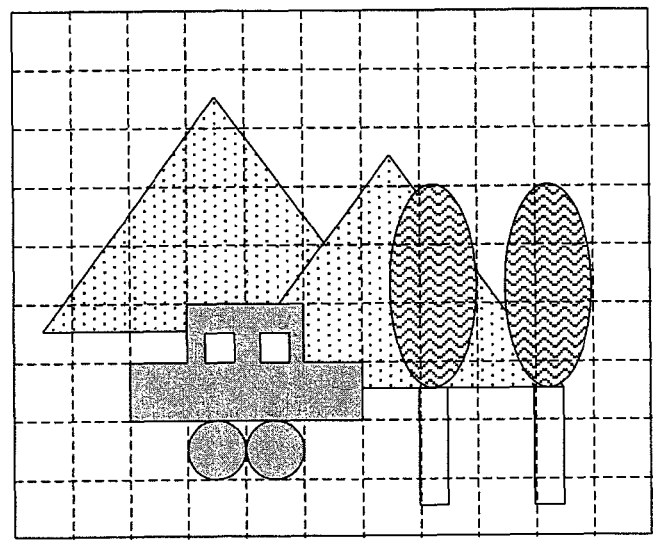
FIG. 13B
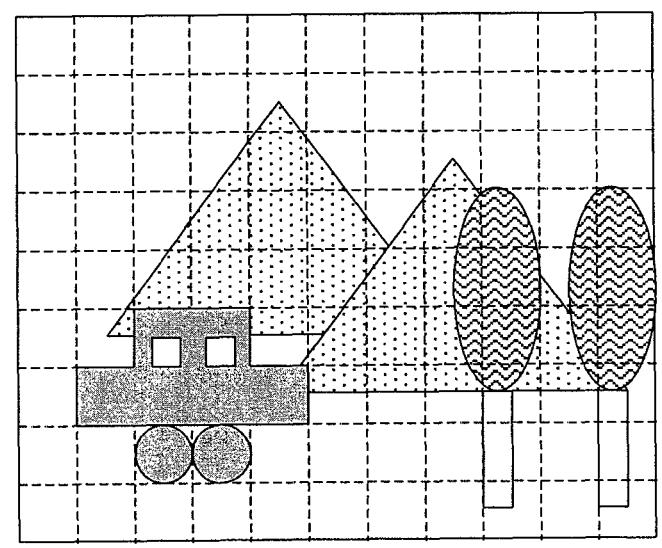
FIG. 13C

MULTI-EYE IMAGING APPARATUS

TECHNICAL FIELD

The present invention relates to a multi-eye imaging apparatus having a pixel shift function.

BACKGROUND ART

Imaging apparatuses for use in mobile apparatuses need to have both a high resolution and a small size. A reduction in size of the imaging apparatus is limited by the size and focal length of an imaging optical lens and the size of an imaging element.

In general, since the index of refraction is different depending on the wavelength of light, a scene including information of all wavelengths cannot be imaged on an image capture surface using a single lens. Therefore, typical imaging apparatuses have an optical system composed of a plurality of lenses superposed together so that light having red, green and blue wavelengths are imaged on the same imaging surface. In this structure, the optical system of the imaging apparatus is unavoidably long, so that the imaging apparatus is thick. Therefore, a multi-eye type imaging apparatus including single lenses having a short focal length has been proposed as a technique effective for a reduction in size of imaging apparatuses, particularly for a reduction in thickness (e.g., Patent Document 1).

A multi-eye type color imaging apparatus has an imaging optical system composed of a lens for light having a blue wavelength, a lens for light having a green wavelength, and a lens for light having a red wavelength. These lenses are arranged on a plane. An imaging region is provided for each lens.

In the imaging region, not only a plurality of imaging elements may be arranged, but also by a single imaging element may be divided into a plurality of regions. In this structure, the wavelength of light handled by each lens is limited, so that a single lens can be used to image an object onto an imaging surface, thereby making it possible to reduce the thickness of the imaging apparatus significantly.

FIG. 19 illustrates a schematic perspective view of a major portion of an exemplary conventional multi-eye type imaging apparatus. 1900 indicates a lens array in which three lenses 1901a, 1901b and 1901c are formed integrally. 1901a is a lens which handles light having a red wavelength. A subject image formed by the lens 1901a is converted into image information by an imaging region 1902a which has a red wavelength separation filter (color filter) attached to a light receiving portion. Similarly, 1901b indicates a lens which handles a light having a green wavelength, and an imaging region 1902b converts the light into green image information. 1901c indicates a lens corresponding to light having a blue wavelength, and an imaging region 1902c converts the light into blue image information.

These images can be superposed and combined to obtain a color image. Note that the number of lenses does not have to be limited to three, and a plurality of images having the same color may be obtained and combined.

Thus, the multi-eye type imaging apparatus can have a thin thickness. However, when images having respective colors are simply superposed and combined, the resolution of the image is determined by the number of pixels of each separated color image. Therefore, the resolution is poor, compared to typical imaging apparatuses having a Bayer array in which green, red and blue filters are arranged in a staggered pattern.

There is a technique called "pixel shift" for improving the resolution of an imaging apparatus. FIG. 20 is a conceptual diagram for explaining how to improve a resolution using the pixel shift technique. FIG. 20 is an enlarged view of a portion of an imaging element. As illustrated in FIG. 20A, the imaging element includes an optical-to-electrical conversion portion 2101 (hereinafter referred to as an "optical-to-electrical conversion portion") which converts received light into an electrical signal, and an invalid portion 2102 (hereinafter referred to as an "invalid portion"), such as a transfer electrode or the like, which cannot convert light into an electrical signal. In the imaging element, the optical-to-electrical conversion portion 2101 and the invalid portion 2102 constitute one pixel. The pixels typically are formed regularly at predetermined intervals (pitches). A portion enclosed with a thick line in FIG. 20A is one pixel, and P indicates one pitch.

An outline of pixel shift performed using such an imaging element will be hereinafter described. Initially, an image is captured at a position of the imaging element illustrated in FIG. 20A. Next, as illustrated in FIG. 20B, the imaging element is shifted in a slanting direction (by ½ of a pixel both in the horizontal direction and in the vertical direction) so that the optical-to-electrical conversion portion 2101 of each pixel is shifted to the invalid portion 2102, before an image is captured. Thereafter, these two captured images are combined, taking into consideration the shift amount of the imaging element, as illustrated in FIG. 20C.

Thereby, a signal can be captured from the invalid portion from which a signal cannot be captured originally. Specifically, the imaged state of FIG. 20C has the same resolution as that when an imaging element having a double number of optical-to-electrical conversion portions is used to pick up an image, as compared to when the imaging element of FIG. 20A is used to perform imaging once. Therefore, if image shift is performed as described above, an image equivalent to one captured using an imaging element having a double number of pixels can be obtained without increasing the number of pixels in the imaging element.

Note that a method for improving the resolution is not limited to the above-described slanting direction shift. When shifting is performed in the horizontal direction or in the vertical direction, the resolution can be improved in the shift direction. For example, when shifts are combined in the vertical direction and in the horizontal direction, the resolution can be increased by a factor of four. In addition, the pixel shift amount is not necessarily limited to 0.5 pixels. By performing a fine pixel shift so that the invalid portion is interpolated, the resolution can be improved further.

Also, although, in the above-described example, a relative positional relationship between the imaging element and incident light is changed by shifting the imaging element, the pixel shift method is not limited to this. For example, the optical lens may be shifted instead of the imaging element. Alternatively, for example, another method has been proposed in which a parallel plate is employed (e.g., Patent Document 1). In the invention of Patent Document 1, an image which is formed on an imaging element is shifted by tilting the parallel plate.

Although the resolution can be improved by such a pixel shift, a plurality of images are captured in time series, and thereafter, are combined to generate a high-resolution image in this pixel shift. Therefore, if images that should interpolate each other are deviated from each other, the resolution may be deteriorated. Therefore, in order to combine a plurality of images captured in time series into a high-resolution image, it is necessary to eliminate a shake caused by the imaging apparatus being moved during capturing an image due to a camera-shake or the like (hereinafter referred to as a "apparatus shake"), and a shake of a subject caused by movement of the subject (hereinafter referred to a "subject shake").

Therefore, it is essential to eliminate or correct a shake occurring in the pixel shift in order to employ the pixel shift technique to compensate for a reduction in resolution, which is a drawback of the multi-eye type that is adopted so as to achieve a small size and a thin thickness.

Some methods of eliminating a shake to the extent possible and some conventional techniques of correcting a shake have been proposed. One method is to capture an image while fixing a camera using a tripod or the like. This method can reduce an influence of an apparatus shake.

Another method is to detect and correct an apparatus shake using a shake detecting means, such as an angular velocity sensor or the like. A correction method of using both this apparatus shake correcting mechanism and the pixel shift mechanism has been proposed (e.g., Patent Document 2 and Patent Document 3).

In the invention of Patent Document 2, a shake detecting means is used to detect a shake amount, and based on the shake amount, a pixel shift direction and a pixel shift amount are corrected, and thereafter, an imaging element is shifted (pixel shift). Thereby, an influence of an apparatus shake can be reduced.

The apparatus shake correcting method does not have to be limited to the above-described method of shifting an imaging element. In Patent Document 3, a portion of optical lenses is moved, depending on a detected shake amount, to perform apparatus shake correction and pixel shift, thereby obtaining a similar effect. As methods of detecting a shake, various methods have been proposed, including a method of using an angular velocity sensor, such as a vibrating gyroscope or the like, a method of obtaining a motion vector by comparing images captured in time series, and the like.

As another method of reducing a shake, Patent Document 3 proposes a method of comparing a plurality of images captured in time series, selecting only images whose positional relationships are appropriately shifted due to an apparatus shake or the like and which have a relationship which can be therefore expected to improve the resolution, and combining the selected images. This method is all performed electrically, so that a mechanical mechanism for correcting an apparatus shake is not required, thereby making it possible to reduce the size of the imaging apparatus.

However, in the case of the fixing method of using a tripod or the like, for example, it is necessary for the user to always carry the tripod, so that the convenience for the user is significantly deteriorated, i.e., the method is not practical.

In the case of the methods of Patent Documents 2 and 3 in which an apparatus shake is detected using a sensor to perform apparatus shake correction and pixel shift, the sensor is newly required, a complicated optical system is required, and the like, which are disadvantageous to the reduction of size and thickness.

On the other hand, in the case of the method of Patent Document 3 in which a plurality of images captured in time series are compared to select images appropriate for combination, and the selected images are combined, a sensor does not have to be newly added. However, it is expected that an image is positioned appropriately by chance due to an apparatus shake or the like, so that the resolution is not reliably improved.

Patent Document 1: JP H6-261236 A
Patent Document 2: JP H11-225284 A
Patent Document 3: JP H10-191135 A

DISCLOSURE OF INVENTION

The present invention is intended to solve conventional problems, such as those described above. An object of the present invention is to provide a multi-eye imaging apparatus of performing pixel shift that is capable of preventing a reduction in the effect of pixel shift even when there is an apparatus shake or a subject shake.

To achieve the object, a multi-eye imaging apparatus according to the present invention comprises a plurality of imaging systems, each including an optical system and an imaging element and having a different optical axis. The plurality of imaging systems include a first imaging system having a pixel shift means for changing a relative positional relationship between an image formed on the imaging element, and the imaging element, and a second imaging system in which a relative positional relationship between an image formed on the imaging element, and the imaging element, is fixed during time-series image capture.

BRIEF DESCRIPTION OF DRAWINGS

FIG. 6 is a diagram illustrating a configuration of an imaging optical system, a pixel shift means, and an imaging element, according to Example 1 of the present invention.

FIG. 13 is a diagram illustrating images captured in time series using a second imaging system that does not perform pixel shift, the images being stored in an image memory, in Example 3 of the present invention.

DESCRIPTION OF THE INVENTION

Figure 1:
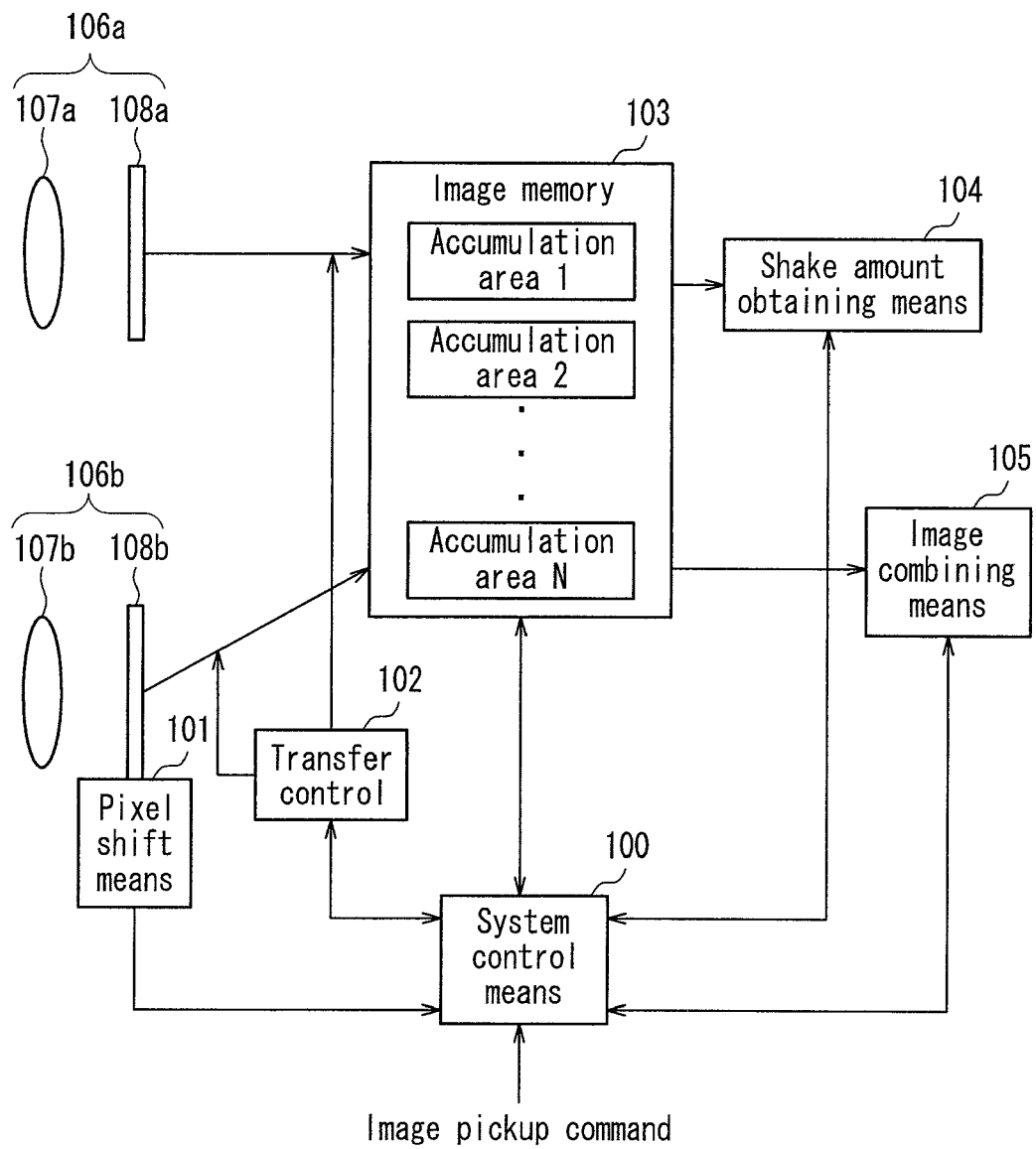
FIG. 1 is a block diagram illustrating a configuration of an imaging apparatus according to Embodiment 1.

According to the present invention, a size and a thickness of an imaging apparatus having a multi-eye type optical system can be reduced, and in addition, a shake amount (an amount of an apparatus shake) of the imaging apparatus can be detected by comparing images captured in time series by a second imaging system that does not perform pixel shift. By using the shake amount, the apparatus shake can be corrected for an image captured by a first imaging system that performs pixel shift. In other words, both a reduction in size and thickness and a high resolution of an imaging apparatus can be achieved.

Preferably, the multi-eye imaging apparatus of the present invention further comprises an image memory for accumulating a plurality of frames of image information captured in time series, a shake amount obtaining means for comparing the plurality of frames of image information accumulated in the image memory to obtain a shake amount, and an image combining means for combining the plurality of frames of images accumulated in the image memory.

Preferably, a change amount of the positional relationship by the pixel shift means is determined based on the shake amount obtained by the shake amount obtaining means. According to this configuration, a pixel shift amount can be adjusted, depending on the apparatus shake amount, thereby advantageously improving the resolution.

The change amount of the positional relationship by the pixel shift means may be fixed. According to this configuration, it is not necessary to obtain a shake amount and adjust a pixel shift amount during image capture, thereby making it possible to reduce an image capture time interval in time series. Thereby, it is possible to reduce an apparatus shake, and capture an image even when a motion of a subject is fast.

Preferably, the multi-eye imaging apparatus further comprises a parallax amount obtaining means for obtaining a magnitude of a parallax from images captured by the plurality of imaging systems having the different optical axes. The image combining means corrects and combines the images based on the parallax amount obtained by the parallax amount obtaining means and the shake amount obtained by the shake amount obtaining means. According to this configuration, when an image is corrected, a parallax depending on a distance to a subject is corrected in addition to correction of a shake, thereby making it possible to improve the resolution of a combined image further. In other words, it is possible to prevent a reduction in resolution depending on the distance to a subject.

Preferably, the multi-eye imaging apparatus further comprises an optimal image selecting means for selecting image information that is used in the combination of the image combining means, from image information captured by the first imaging system and image information captured by the second imaging system that are accumulated in the image memory, based on the shake amount obtained by the shake amount obtaining means and the parallax amount obtained by the parallax amount obtaining means. According to this configuration, images before and after a shake, an image having a parallax, and a pixel-shifted image can be obtained using the first and second imaging systems, thereby making it possible to select an image suitable for improvement of the resolution without relying on chance.

Preferably, the multi-eye imaging apparatus further comprises means for discriminating different subjects. The shake amount obtaining means obtains a shake amount for each of the different subjects, and the image combining means combines images for each of the different subjects. According to this configuration, by obtaining a shake amount for each subject, the resolution can be improved, even when a whole image is not uniformly moved, due to motions of subjects.

Preferably, the multi-eye imaging apparatus further comprises means for dividing image information into a plurality of blocks. The shake amount obtaining means obtains a shake amount for each of the plurality of blocks, and the image combining means combines images for each of the plurality of blocks. Also, according to this configuration, the resolution can be improved when there is a shift amount of a subject. In addition, detection of a subject is not required, thereby making it possible to reduce a process time.

Preferably, the plurality of imaging systems having the different optical axes are composed of an imaging system for handling a red color, an imaging system for handling a green color, and an imaging system for handling a blue color. For at least one corresponding to one color of the imaging systems corresponding to the respective colors, the number of the imaging systems corresponding to the one color is two or more, and the two or more imaging systems for handling the one color include the first imaging system and the second imaging system. According to this configuration, a color image having an improved resolution can be obtained.

Hereinafter, an embodiment of the present invention will be described with reference to the accompanying drawings.

Embodiment 1

FIG. 1 is a block diagram illustrating a configuration of an imaging apparatus according to Embodiment 1. A system control means 100 is a Central Processing Unit (CPU) which controls the whole imaging apparatus. The system control means 100 controls a pixel shift means 101, a transfer means 102, an image memory 103, a shake amount obtaining means 104, and an image combining means 105.

An image of a subject (not shown) to be captured is captured using a first imaging system 106b that has the pixel shift means 101 and a second imaging system 106a that does not have a pixel shift function. The subject is imaged on imaging elements 108a and 108b using an imaging optical system 107a and an imaging optical system 107b, and is converted into image information as a light intensity distribution.

The pixel shift means 101 shifts a relative positional relationship between the subject image formed on the imaging element 108b by the imaging optical system 107b, and the imaging element 108b, in an in-plane direction of the imaging element 108b. In other words, by using the pixel shift means 101, a relative positional relationship between the imaging element 108b and a ray of light incident to the imaging element 108b can be changed during capturing images in time series.

On the other hand, a positional relationship between the imaging optical system 107a and the imaging element 108a is caused not to be changed in an in-plane direction of the imaging element 108a. Therefore, a relative positional relationship between a subject image formed on the imaging element 108a by the imaging optical system 107a, and the imaging element 108a, is fixed during capturing images in time series. In other words, in the second imaging system 106a, a relative positional relationship between the imaging element 108a and a ray of light incident to the imaging element 108a, is fixed during capturing images in time series.

The transfer means 102 transfers image information obtained by optical-to-electrical conversion in the imaging elements 108a and 108b, to the image memory 103 which stores images.

The first imaging system 106b and the second imaging system 106a are separately driven to transfer and store respective images successively into the image memory 103. As described below, a pixel shift amount is adjusted while detecting a shake amount using images captured by the second imaging system 106a. Therefore, the second imaging system 106a can be driven at higher speed. In other words, the second imaging system 106a can capture a larger number of images per unit time.

The shake amount obtaining means 104 compares pieces of image information captured at different times (in time series) using the second imaging system 106a (i.e., an optical system without pixel shift), to obtain a shake amount. A pixel shift amount of the first imaging system 106b is set so as to correct the shake amount, and a pixel-shifted image is accumulated in the image memory 103, though a detail thereof will be described below.

The image combining means 105 combines images that are captured by the first imaging system 106b and the second imaging system 106a and are stored in the image memory 103, to generate a high-resolution image.

Figure 2:
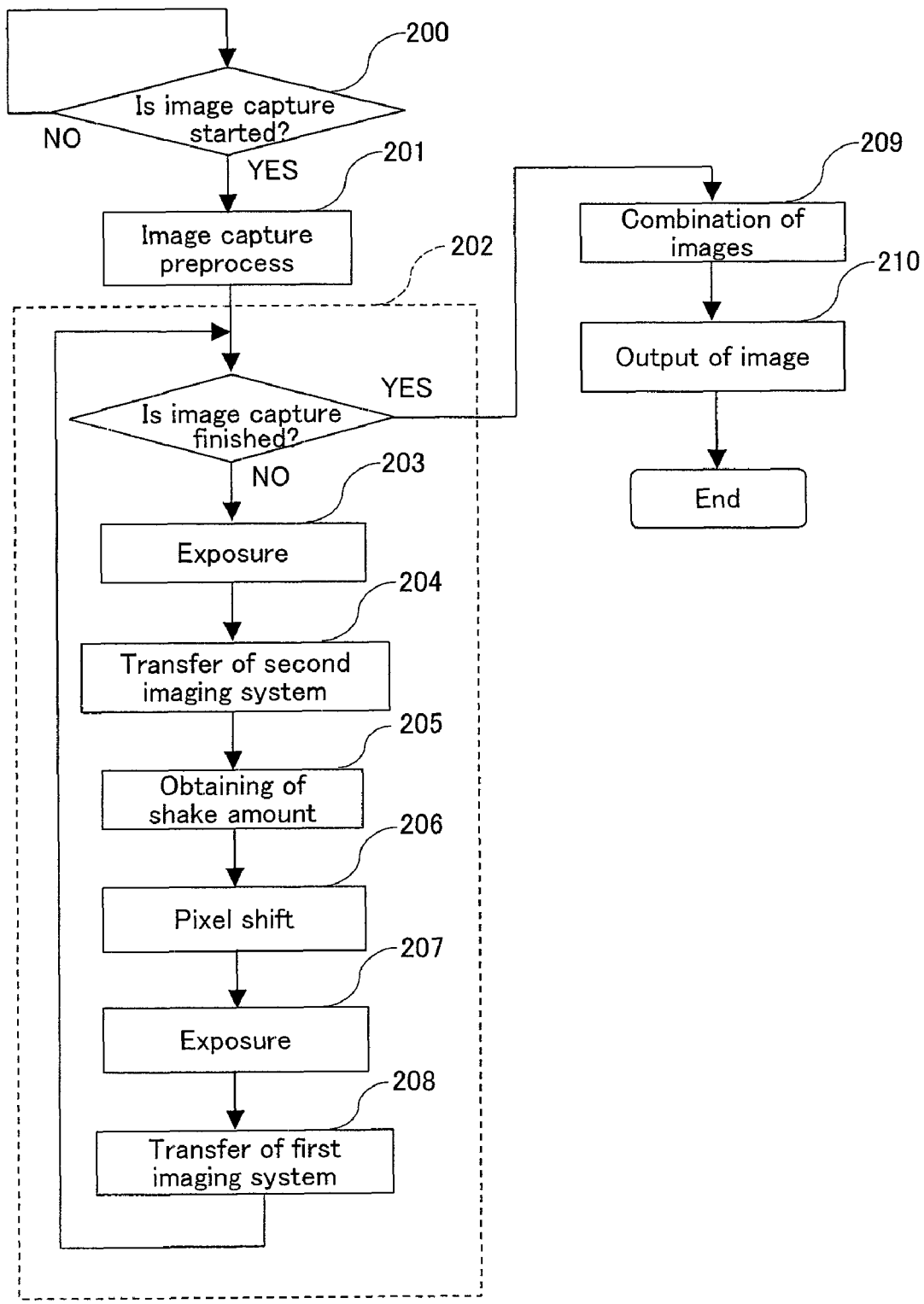
FIG. 2 is a flowchart illustrating a whole operation of the imaging apparatus of Embodiment 1 of the present invention.

FIG. 2 is a flowchart illustrating a whole operation of the imaging apparatus of this embodiment. Image capture is started by an image capture start command of step 200. When image capture is started, an image capture preprocess of step 201 initially is performed. In this process, an optimal exposure time is calculated, and a focusing process is performed.

For example, there is a phenomenon that if a distance between a subject and an imaging apparatus is changed, an imaging distance is changed, so that an image is blurred. To correct the phenomenon, a distance between an imaging optical system and an imaging element is adjusted (focusing). Focusing can be achieved by using a property that a captured image has a maximum contrast when a focus is obtained, and changing a space (imaging distance) between the imaging optical system and the imaging element using a focusing actuator (not shown).

Note that contrast does not have to be used necessarily for focusing, and a distance to a subject may be measured using laser, radio wave, or the like, to perform focusing.

Also, an optimal exposure time needs to be adjusted, taking ambient light into consideration. To this end, there are a method of detecting brightness using an illuminance sensor to set an exposure time, a method of providing a preview function that takes in an image before the start of image capture, and the like. In the case of the method of providing the preview function, an image taken in before the start of image capture is converted into a grayscale image (i.e., brightness information). Thereafter, if the histogram is unbalanced to a white color (bright), it is determined that exposure is excessive (excessively long exposure time), and if the histogram is unbalanced to a black color (dark), it is determined that exposure is insufficient (excessively short exposure time), and the exposure time is adjusted.

When the preview function is possessed, by performing this preprocess before an image capture start command, a time required from the image capture start command to the start of exposure can be reduced.

Next, in step 202, image capture is performed using pixel shift. The image capture is performed by repeatedly performing the processes of steps 203 to 208.

Step 203 is an exposure process of the second imaging system 106a, and step 204 is a process of transferring an image captured by the second imaging system 106a to the image memory 103. Images captured by the second imaging system 106a at different times are transferred to the image memory 103.

In step 205, the images accumulated in the image memory 103 are compared to obtain a shake amount (a shake amount of the imaging apparatus). In step 206, based on a pixel shift amount that is adjusted, taking into consideration the shake amount obtained in step 205, image capture is performed while performing pixel shift using the first imaging system 106b. Step 207 is an exposure process of the first imaging system 106b, and step 208 is a process of transferring an image captured by the first imaging system 106b to the image memory 103.

Of these processes, obtaining of a shake amount will be initially specifically described. As described above, when image capture is performed at different times, a shake occurs in an image due to an apparatus shake or a subject shake between each time. It is necessary to determine a pixel shift amount, taking this shake into consideration, so as to utilize the invalid portions of pixels by pixel shift.

Therefore, in step 202, images captured at different times by the second imaging system 106a that does not perform pixel shift are taken in immediately before pixel shift, a shake amount is calculated, and the shake amount is reflected on the pixel shift amount.

In the process of obtaining a shake amount in step 205, an apparatus shake amount of the imaging apparatus is obtained as described above. Hereinafter, a specific method of performing this will be described. A position where a subject is seen is moved in images captured in time series if there is an apparatus shake or a subject shake.

If the time interval is short, it can be assumed that the shape of the subject is not changed and the position of the subject is moved. Therefore, of two images having different image capture times, one is a comparative reference image, and the other is a comparative target image, and by examining to what portion of the comparative target image a predetermined region of the comparative reference image is shifted, it is possible to determine how the image is moved.

More specifically, in order to examine to what region of the comparative target image a specific region of the comparative reference image (hereinafter referred to as a "comparative reference region") corresponds, an evaluation region having the same size that of the comparative reference region is set in the comparative target image, and it is evaluated to what extent the comparative reference region and the evaluation region resemble each other. Thereafter, evaluation regions are set successively at other positions, and the destination of the comparative reference region is searched for while performing the evaluation in each evaluation region. In this case, an evaluation region that resembles the comparative reference region most is the destination of the comparative reference region.

An image captured by an imaging element can be assumed to be a set of light intensities corresponding to respective pixels. Therefore, if an upper left of the image is the origin, and the light intensity of a pixel which is an x-th pixel to the right in the horizontal direction and a y-th pixel downward in the vertical direction is represented by I(x, y), the image can be assumed to be a distribution of the light intensity I(x, y).

Figure 3:
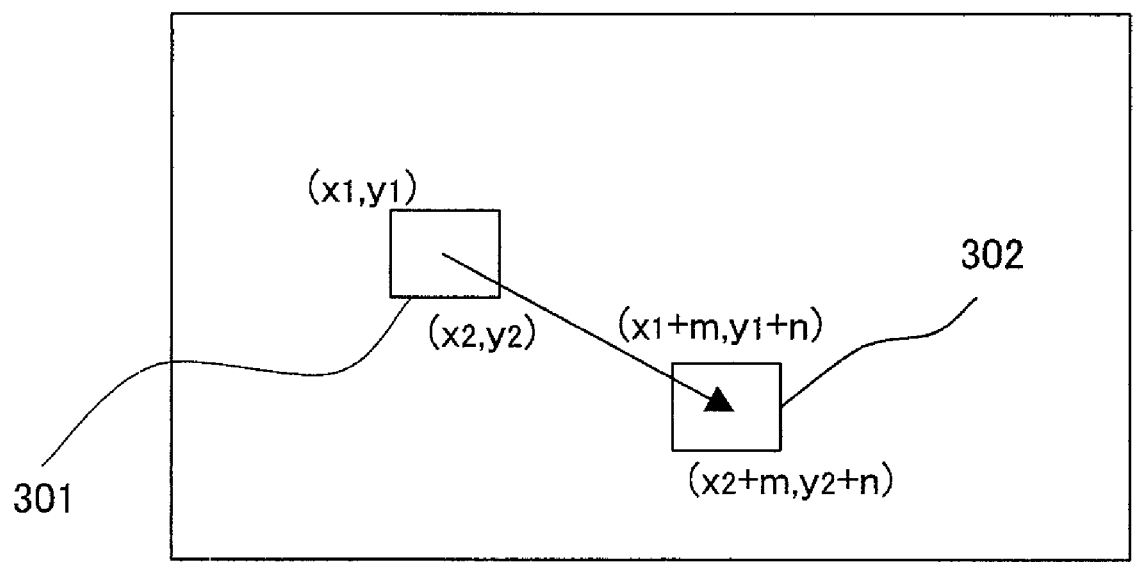
FIG. 3 is a diagram illustrating a positional relationship between a comparative reference region and an evaluation region according to an embodiment of the present invention.

FIG. 3 illustrates a positional relationship between a comparative reference region 301 and an evaluation region 302. In the example of FIG. 3, the comparative reference region is set to be in the shape of a rectangle which has an upper left pixel located at (x1, y1) and a lower right pixel located at (x2, y2). In this case, an evaluation region (m, n) shifted by m pixels in the right direction and n pixels in the downward direction from the comparative reference region can be represented by a region having an upper left pixel located at (x1+m, y1+n) and a lower right pixel located at (x2+m, y2+n).

An evaluation value R(m, n) indicating a correlation between the evaluation region and the comparative reference region (how much they resemble each other) is represented by the sum of the absolute values of differences in light intensity between each pixel, as indicated by (expression 1).

$$R(m, n) = \sum_{y=y_1}^{y_2-y_1} \sum_{x=x_1}^{x_2-x_1} |I_1(x, y) - I_2(x+m, y+n)| \quad \text{(expression 1)}$$

The more the comparative reference region and the evaluation region resemble each other, the smaller the difference in light intensity between corresponding pixels in the two regions. Therefore, the evaluation value R(m, n) indicates a smaller value as the correlation between the light intensity distributions (image) of the comparative reference region and the evaluation region increases (they resembles each other to higher extent).

Note that, since the correlation between the regions is compared, m and n are not necessarily limited to integers. Data I'(x, y) is newly created by interpolating between each pixel from the original light intensity I(x, y), and based on I'(x, y), the evaluation value R(m, n) is calculated in accordance with (expression 1), thereby making it possible to obtain a shake amount having a non-integer value (subpixel accuracy). As the data interpolation method, either linear interpolation or nonlinear interpolation may be used.

Thus, a shake amount is obtained by searching for an evaluation region that resembles the comparative reference region most with subpixel accuracy while changing the values of m and n. In this case, since the shake directions of an apparatus shake and a subject shake are not limited to specific directions, negative values also need to be studied for the values of m and n (evaluation of regions shifted in the left direction or in the upward direction).

m and n may be changed so that the whole range of the comparative target image can be evaluated. However, when the image of a subject is moved significantly due to an apparatus shake, so that the image is departed from the light receiving range of the imaging element, the subject cannot be combined as an image. Therefore, in general, it is preferable that m and n be limited to a predetermined range, thereby reducing a calculation time. A combination of m and n thus found that minimizes the evaluation value R(m, n) is a shake amount indicating the position of a region of a comparative target image corresponding to the comparative reference region.

Note that the comparative reference region is not necessarily limited to rectangles, and can be set to be in any arbitrary shape. Also, the calculation of the evaluation value is not necessarily limited to the sum of the absolute values of differences in light intensity. Any function indicating the correlation (e.g., normalization is performed for each region before obtaining the correlation, etc.) may be used to calculate the evaluation value.

The method of performing comparison using the image correlation also can be used when a parallax amount described below is obtained, and also can be used for calibration of the pixel shift means. For example, before or after pixel shift is performed by the pixel shift means, an image is captured and a deviation amount of the image is evaluated, thereby making it possible to confirm whether or not the actuator used for pixel shift is correctly operated under ambient environments (air temperature and deterioration over time). By such a process, pixel shift can be performed reliably by the actuator.

Figure 4A:
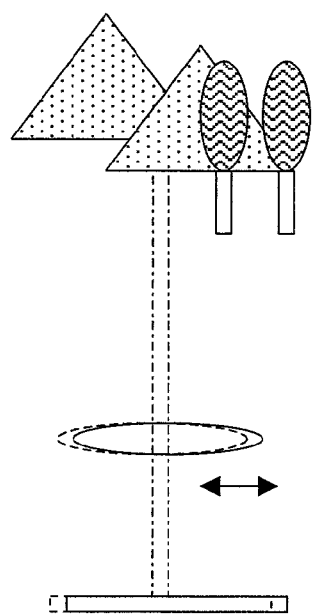
FIG. 4 is a diagram illustrating a motion of an image due to an apparatus shake according to an embodiment of the present invention.
Figure 4B:
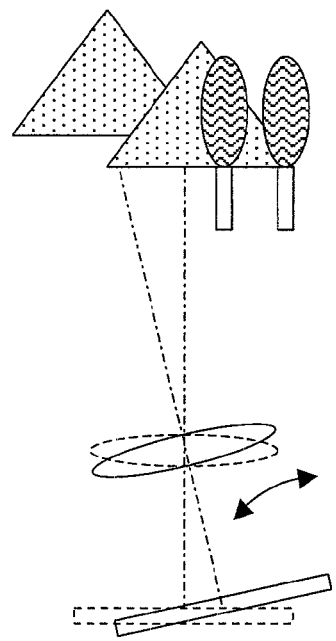
Figure 4C:
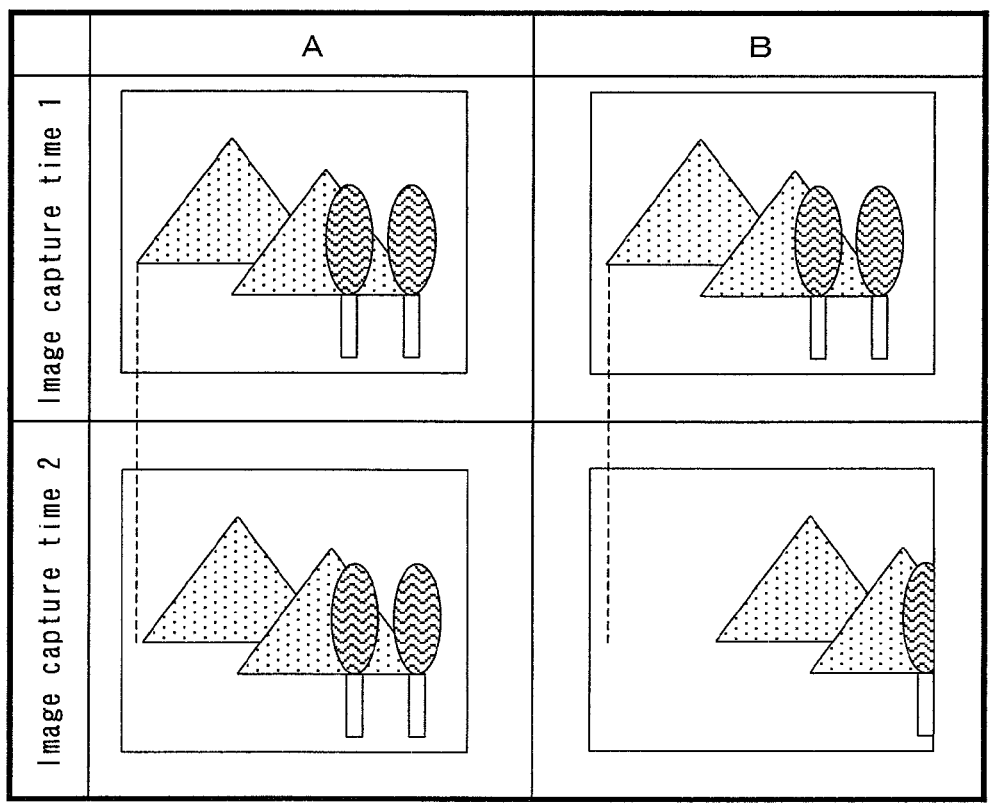

Hereinafter, an apparatus shake will be described in more detail with reference to FIG. 4. FIG. 4 is a diagram illustrating a motion of an image due to an apparatus shake in this embodiment. FIG. 4 illustrates an example in which an image of a landscape which has a less motion of a subject is captured. FIG. 4A is a diagram illustrating the case where a subject and a camera are parallel shifted, and A of FIG. 4C indicates a change between images at image capture times 1 and 2. FIG. 4B is a diagram illustrating the case where a camera is horizontally rotated, and B of FIG. 4C illustrates a change between images at image capture times 1 and 2.

In either the case where the imaging apparatus is parallel shifted as illustrated in FIG. 4A or the case where the imaging apparatus is rotated as illustrated in FIG. 4B, the image can be assumed to be parallel shifted in a plane. However, as illustrated in FIG. 4C, there is a more significant influence on the image when an optical axis is deviated due to the rotation than when the parallel shift is performed. FIG. 4B illustrates the example in which the camera is horizontally rotated, and the same is true of when the camera is vertically rotated. Thus, by correcting the parallel shift of an image due to the parallel shift or rotation of the imaging apparatus, the apparatus shake can be corrected.

When the imaging apparatus is rotated, an image can be assumed to be parallel shifted. Strictly speaking, since the distance between the subject and the lens is changed partially, a slight distortion occurs in the image. If the slightly distorted images simply are superposed, portions that originally coincide with each other do not coincide with each other, so that the resolution improving effect of pixel shift is reduced.

Therefore, if the image distortion due to the rotation is detected and corrected, the resolution can be improved further. Also, when a shake amount of an image is obtained in one specific evaluation region, only the parallel shift of the image can be obtained. Therefore, if a plurality of evaluation regions are set and shake amounts are obtained in the respective regions, an apparatus shake amount and an image distortion can be obtained in each evaluation region. By deforming an image to be superposed, depending on the image distortion, it is possible to prevent a deterioration in image, thereby making it possible to obtain a high-resolution image.

Figure 5:
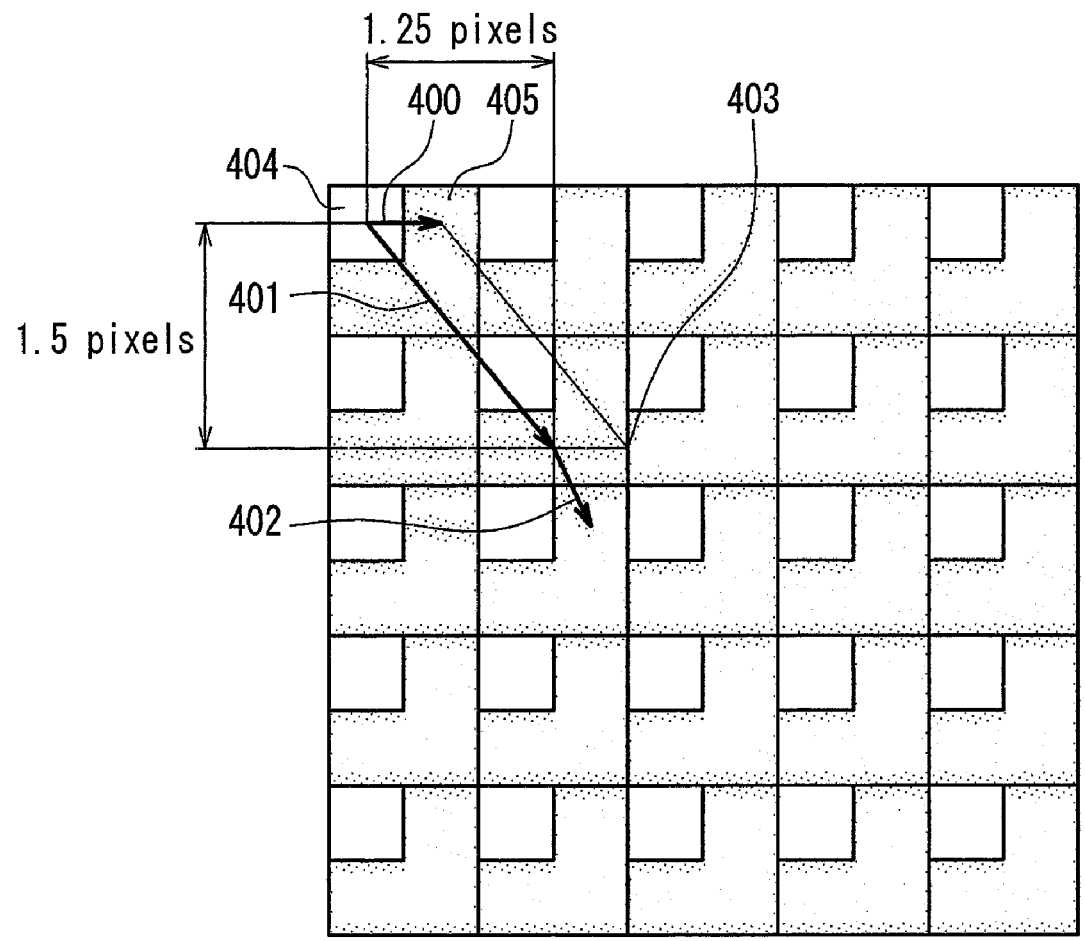
FIG. 5 is a diagram for explaining adjustment of a pixel shift amount according to an embodiment of the present invention.

Next, adjustment of a pixel shift amount will be described specifically. FIG. 5 is a diagram for explaining adjustment of a pixel shift amount. FIG. 5 is an enlarged view of a portion of an imaging element, indicating an expected pixel shift vector 400, a shake vector 401 detected by a shake obtaining means, and an actual pixel shift vector 402.

When there is no apparatus shake, it is necessary to perform shift by 0.5 pixels in the X direction and 0 pixels in the Y direction (as indicated with the vector 400) so as to utilize effectively an invalid portion 405 provided to the right of an optical-to-electrical conversion portion 404. On the other hand, the vector 401 indicates an example in which shift occurs by 1.25 pixels in the X direction and 1.5 pixels in the Y direction due to an apparatus shake. In this case, when pixel shift is performed without adjustment of a pixel shift amount (i.e., pixel shift is performed by 0.5 pixels in the X direction as indicated with the vector 400), the next image capture is performed at a position 403 which is obtained by combining the vector 400 and the vector 401. In this case, image capture is performed at a portion that is different from the portion originally utilized and is located to the right of the optical-to-electrical conversion portion 404.

Here, the optical axis is deviated slightly due to a motion caused by an apparatus shake, but the deviation is considerably small. Therefore, an image when the shift amounts in the X direction and the Y direction of the vector 401 are each an integer pitch (an integral multiple of one pixel pitch) can be assumed to be the same image as that which is obtained by shifting the coordinates of a pixel by an integer number of pixels. In other words, image capture at image capture time 2 by the second imaging system 106a that does not perform pixel shift is the same as that which is obtained by capturing and superposing an image already captured at image capture time 1 at different pixels. Therefore, in this case, in the first imaging system 106b which performs pixel shift, as is similar to when there is no apparatus shake, by performing shift by 0.5 pixels in the X direction (as indicated with the vector 400), a portion of the invalid portion 405 provided to the right of the optical-to-electrical conversion portion 404 can be used for image capture, thereby making it possible to obtain the effect of pixel shift.

Specifically, it is the non-integer portion (fractional part) of the pitch of an apparatus shake that has an influence on the effect of pixel shift.

Therefore, if a new pixel shift vector is set so that the non-integer portion of the pitch of the apparatus shake becomes equal to the shift amount of the vector 400, the effect of pixel shift can be obtained. In the above-described example, the non-integer portion of the X-direction pitch of the shake vector 401 is 0.25 pixels and the non-integer portion of the Y-direction pitch is 0.5 pixels. In this case, a new pixel shift vector may be set so that the non-integer portion of the X-direction pitch becomes 0.5 pixels and the non-integer portion of the Y-direction pitch becomes 0 pixels.

Therefore, by setting a pixel shift vector to have 0.25 pixels in the X direction and 0.5 pixels in the Y direction as indicated with the vector 402 of FIG. 5, when the new pixel shift vector is combined with the apparatus shake vector 401, the same positional relationship is obtained as that when pixel shift is performed using the original pixel shift vector 400. In other words, according to this embodiment, a pixel shift vector is adjusted, depending on a shake vector, thereby making it possible to obtain the effect of pixel shift invariably.

A series of steps in step 202 are performed repeatedly until the set number of times of image shift is finished, and thereafter, in step 209, images accumulated in the image memory are combined. Thereafter, in step 210, an image is output, so that image capture is ended. Hereinafter, a specific example will be described.

EXAMPLE 1

FIG. 6 illustrates a configuration of an imaging optical system, a pixel shift means, and an imaging element, according to Example 1. As the imaging optical system, two aspherical lenses 601a and 601b each having a diameter of 2.2 mm were used. The lenses were assumed to have optical axes that are substantially parallel to a Z axis in FIG. 6 and have an interval of 3 mm.

A first imaging system that performs pixel shift was provided with a glass plate 602 on the optical axis of the lens 601b. The glass plate 602 can be tilted with respect to an X axis and a Y axis using a piezoelectric actuator and a tilting mechanism (not shown). In this example, pixel shift was performed by ½ (1.2 μm) of a pixel pitch in a horizontal direction (X-axis direction), thereby doubling the number of pixels. As the glass plate 602, BK7 was used, which is an optical glass having a width (X-axis direction) of 2 mm, a height (Y-axis direction) of 2 mm, and a thickness (Z axis direction) of 500 μm.

As an imaging element 603, a black-and-white CCD 603 was used in which a pitch between adjacent pixels is 2.4 μm. The glass plate 602 and the imaging element 603 have light receiving surfaces that are substantially parallel to the XY plane of FIG. 6. Also, the imaging element 603 is divided into two regions 603a and 603b, which correspond to the respective optical systems in one-to-one correspondence. A read circuit and a drive circuit were provided for each of the regions 603a and 603b of the imaging element 603 so that images can be read from the regions 603a and 603b separately.

When image capture was performed while holding an apparatus according to this example by hand, the resolution was improved under an environment that the exposure time is short and the motion of a subject is small (e.g., an outdoor landscape under clear sky, etc.).

Although, in this example, a method of tilting the glass plate is used as the pixel shift means, the pixel shift means is not limited to this method. For example, an actuator employing a piezoelectric element, an electromagnetic actuator, or the like may be used to physically move the imaging element or the lens in a predetermined amount. Thus, even if other means are used as the pixel shift means, the configuration of FIG. 6 is not changed, except for the glass plate 602.

Although, in this example, one imaging element is divided into two regions, two different imaging elements may be employed for the respective optical systems in one-to-one correspondence. Any form of imaging element may be used as long as a plurality of imaging regions correspond to respective optical systems in one-to-one correspondence.

Embodiment 2

Figure 7:
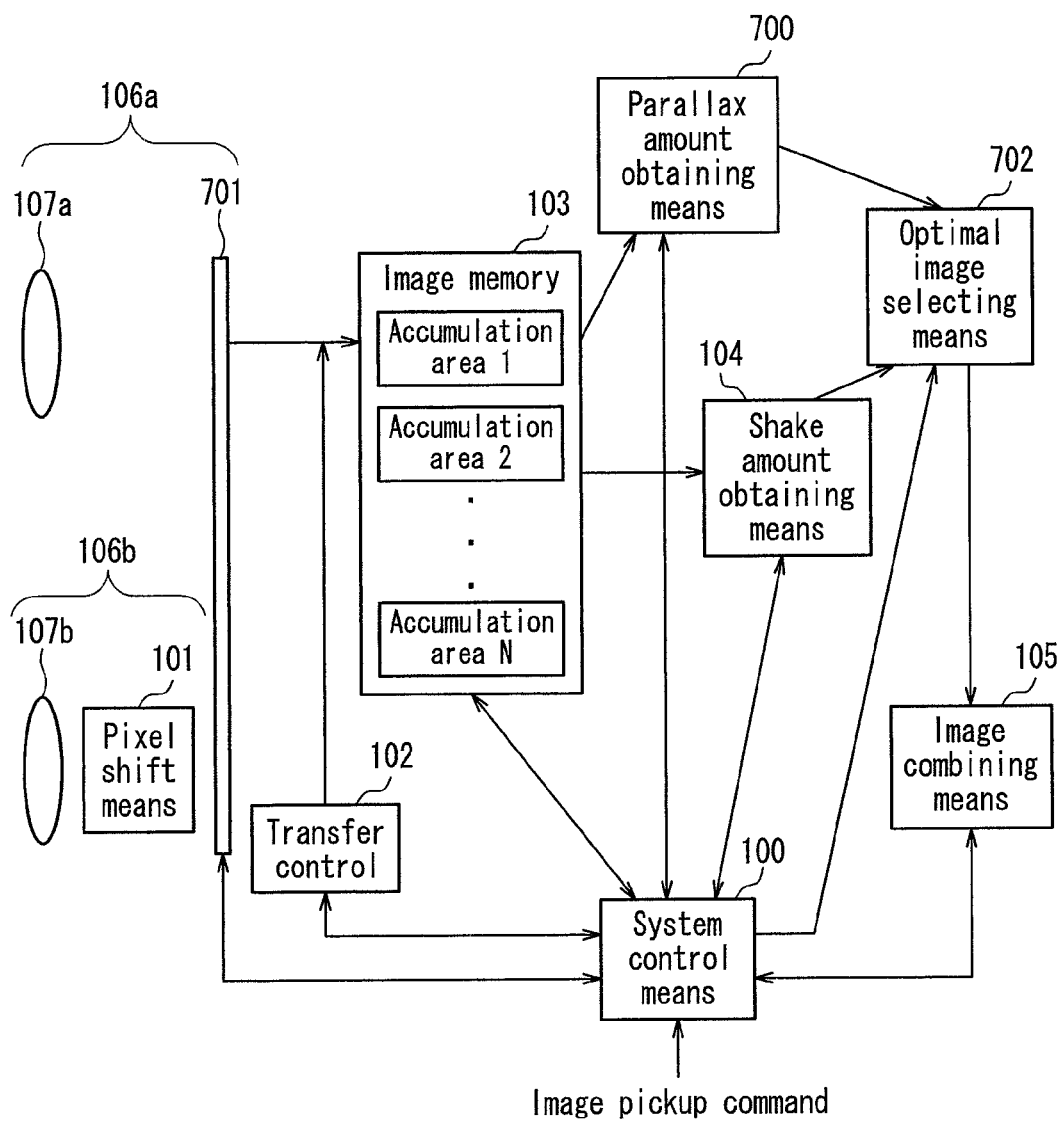
FIG. 7 is a block diagram illustrating a configuration of an imaging apparatus according to Embodiment 2 of the present invention.

FIG. 7 illustrates a configuration of an imaging apparatus according to Embodiment 2. Embodiment 2 is different from Embodiment 1 mainly in that a parallax amount obtaining means 700 is added, an imaging element 701 is formed integrally, image capture is performed by a first imaging system and a second imaging system at substantially the same time, and an optimal image selecting means 702 for selecting images to be combined, based on a parallax amount and a shake amount, is added. Portions overlapping Embodiment 1 will not be described.

Figure 8:
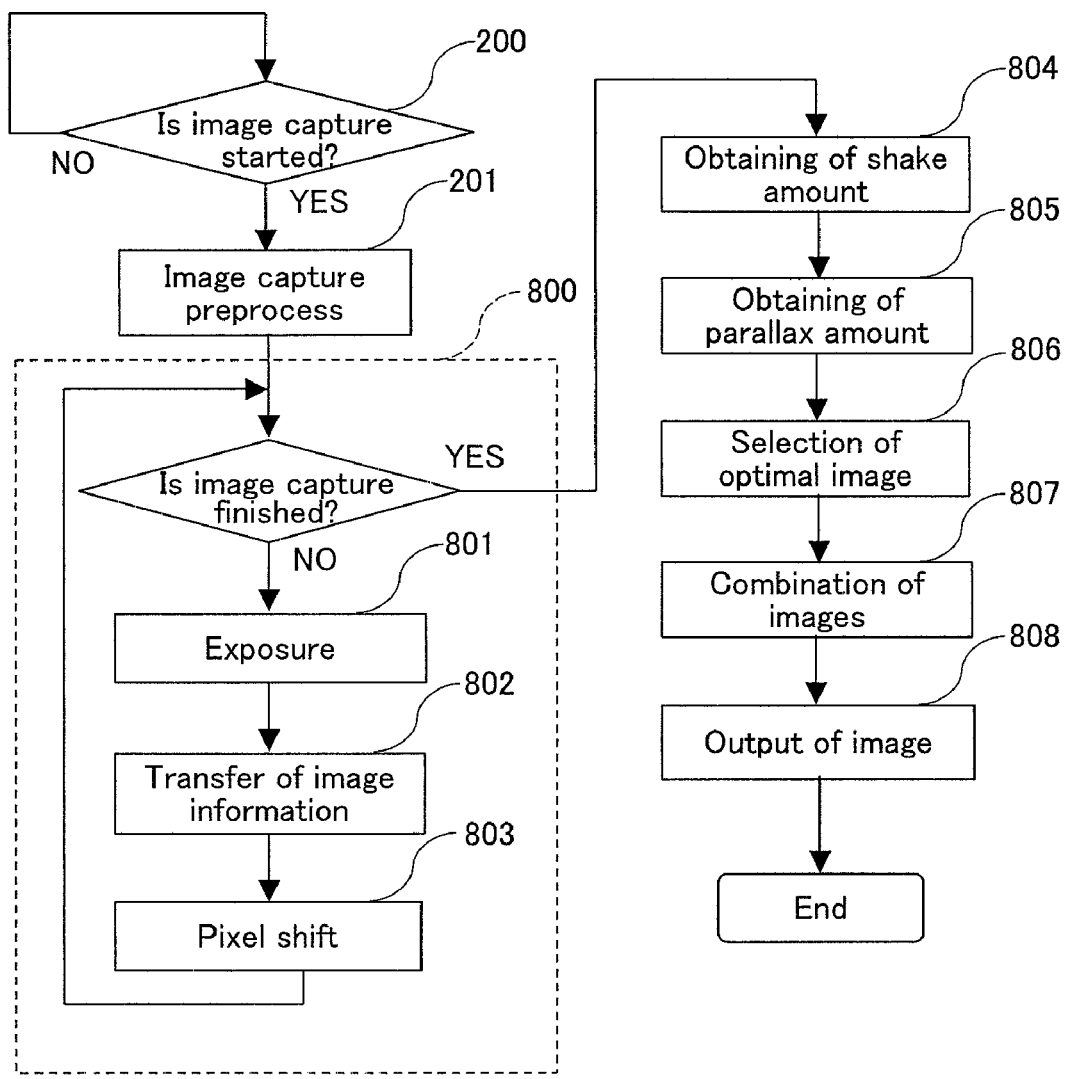
FIG. 8 is a flowchart illustrating a whole operation of the imaging apparatus of Embodiment 2 of the present invention.

FIG. 8 illustrates a flowchart of the whole operation of the imaging apparatus of this embodiment. An imaging start command in step 200 and an image capture preprocess in step 201 are similar to those of Embodiment 1.

In step 800, image capture is performed using pixel shift. In step 800, a process of exposing the imaging element (step 801), a process of transferring an image of the imaging element to the image memory 103 (step 802), and a pixel shift process (step 803) are repeatedly performed.

The imaging element 701 is shared by the first imaging system 106*b* and the second imaging system 106*a*, so that image capture is performed with substantially the same timing. The pixel shift amount is a value fixed irrespective of an apparatus shake amount, and is an amount of pixels set so that an invalid pixel can be utilized effectively when there is no apparatus shake (e.g., 0.5 pixels).

Specifically, step 800 is different from step 202 of Embodiment 1 of FIG. 2 in that the step of taking in an image using the second imaging system 106*a* so as to adjust the pixel shift amount and obtaining a shake amount (step 205 of FIG. 2) is omitted. Therefore, an interval between the image capture time 1 at which image capture is performed without pixel shift and the image capture time 2 at which image capture is performed using pixel shift, can be reduced. Thereby, an apparatus shake can be reduced, and image capture can be achieved even when the motion of a subject is faster, as compared to Embodiment 1.

After the image capture using pixel shift of step 803 is finished, some images captured in time series among images accumulated in the image memory 103 are compared using a method similar to that of step 205 of Embodiment 1 to obtain a shake amount in step 804. When there is a motion of a subject or the like, shake amounts are not uniform among the images, so that if shake amounts are collectively obtained and superposed, the shake amounts are not correctly superposed, so that the resolution is not improved at some places.

Therefore, an image is divided into blocks, and a shake amount is obtained for each divided block, thereby making it possible to improve the resolution throughout the image. This division is not necessarily limited to rectangles, and the detection of subjects may be performed separately, an image may be divided into the subjects, and a shake amount may be detected for each subject.

Next, in step 805, images captured by the imaging systems having different optical axes at the same time are compared to obtain a parallax amount. When image capture is performed using the imaging systems having the different optical axes, not only the image formation positions are separated by a distance between the centers of the lenses, but also the relative position of subject images formed on the imaging element varies, depending on a distance to the subject.

Figure 9:
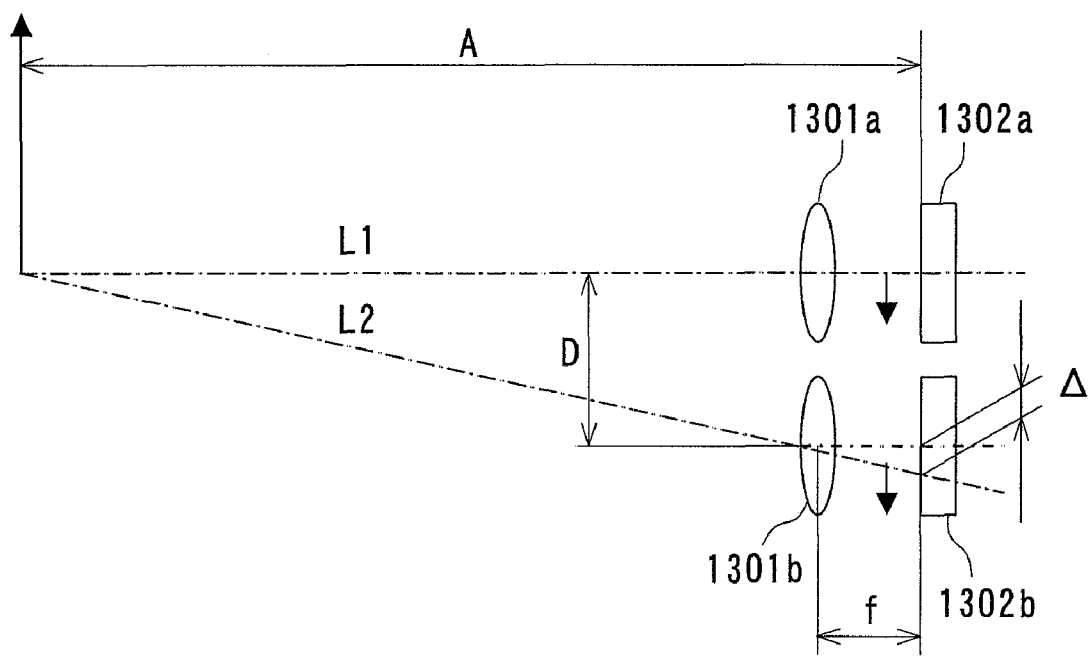
FIG. 9 is a diagram for explaining a parallax according to an embodiment of the present invention.

This difference is called a parallax. FIG. 9 is a diagram for explaining the parallax. In FIG. 9, for the sake of simplicity, two imaging optical systems 1301*a* and 1301*b* having the same characteristics are provided at locations separated from each other by a distance D, and the imaging optical systems have image formation surfaces 1302*a* and 1302*b*, respectively.

In this case, the imaging optical systems 1301*a* and 1301*b* observe the same subject from different positions. Therefore, a parallax occurs between images formed on the image formation surfaces 1302*a* and 1302*b*. A parallax amount $\Delta$ is given by (expression 2) below. D indicates an interval between an optical axis of the imaging optical system 1301*a* and an optical axis of the imaging optical system 1301*b*, f indicates a focal length of the imaging optical systems 1301*a* and 1301*b*, and A indicates a distance between a subject and the image formation surfaces 1302*a* and 1302*b*.

$$\Delta = D \cdot f / (A-f) \qquad \text{(expression 2)}$$

When A is sufficiently large so that the subject is assumed to be located at infinity, the parallax amount A can be represented by D·f/A, and $\Delta$ can be assumed to be 0. In this case, images captured by the imaging optical systems 1301*a* and 1301*b* can be assumed to be the same. Therefore, if the center-to-center distance D of the two lenses is corrected, the images can be combined as they are.

However, if A is small, the parallax amount $\Delta$ is a finite value and is not negligible. Specifically, the images captured by the imaging optical system 1301*a* and the imaging optical system 1301*b* have a difference due to a parallax, depending on the distance to a subject, and cannot be assumed to be the same. Therefore, the images cannot be superposed and combined as they are.

It is necessary to obtain a parallax for each subject so as to correct the parallax. The parallax may be obtained by dividing images having different optical axes that are captured at the same time into blocks, and examining where corresponding blocks are shifted. This process can be achieved by comparing images using (expression 1) and searching for a place having a high correlation as in the case where the images are compared to obtain a shake amount.

Note that the center-to-center distance D of the two lenses may be calculated based on a lens-to-lens distance, or alternatively, may be calculated by providing a subject (marker) at infinity, and assuming that the position where the image is formed is a center of the lens.

The method of dividing into blocks is not limited to this, and the number of pixels or the shape of each divided block may be changed. As is different from the obtaining of a shake, a direction in which a parallax occurs is limited to a linear direction connecting the origins of the imaging elements (intersections of the imaging elements and the optical axes of the respective corresponding optical systems), and therefore, when a parallax is detected, a combination of m and n in (expression 1) may be limited, depending on the direction.

Next, in step 806, a combination of images that improves the resolution when the images are combined based on the shake amount and the parallax amount is selected. As described above, the resolution is improved by pixel shift if pixels to be superposed are shifted so that invalid portions thereof are utilized. Not only images pixel-shifted in time series, but also images shifted due to a parallax or an apparatus shake, can be similarly used.

Figure 10:
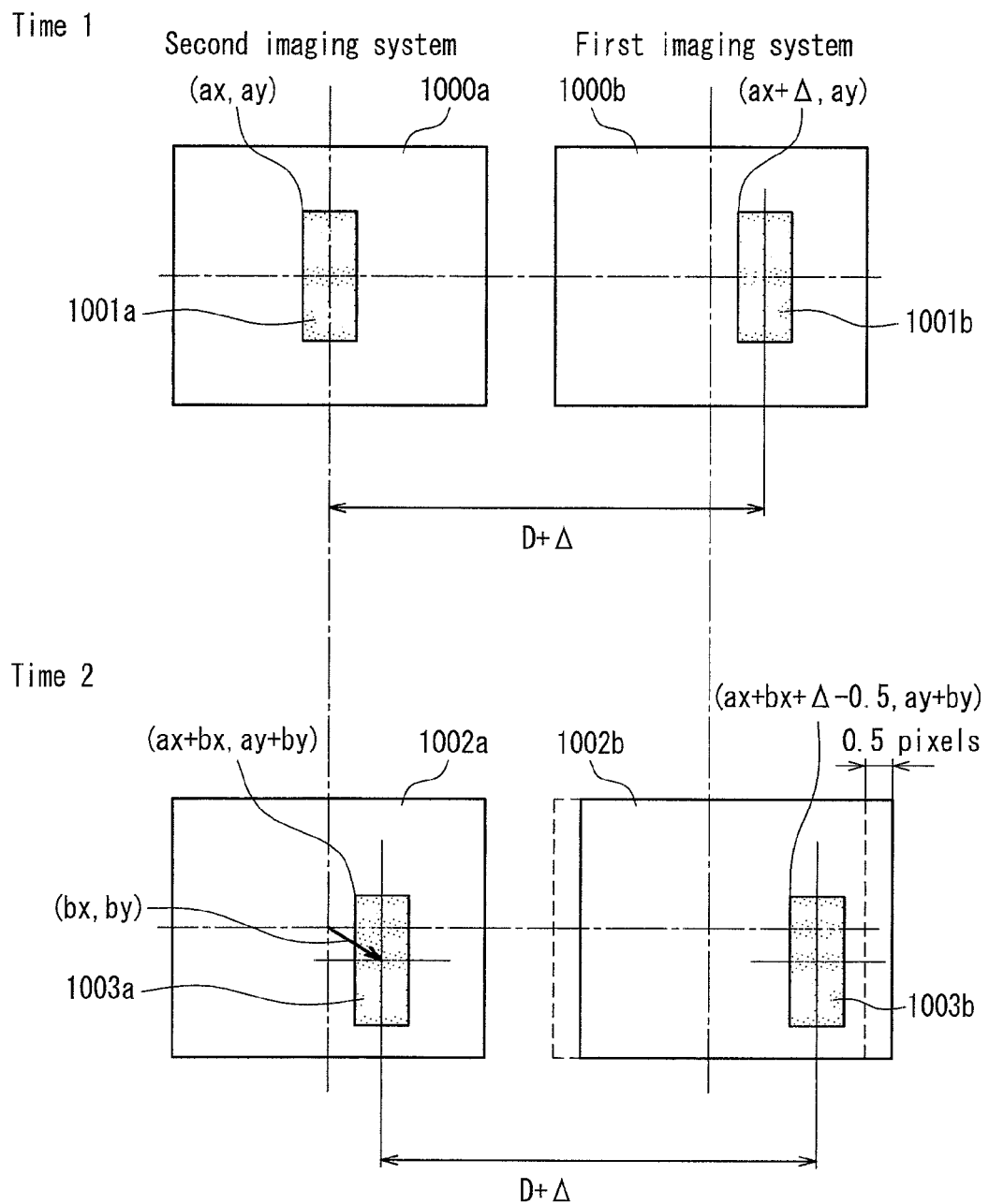
FIG. 10 is a diagram for explaining a method of selecting an optimal image according to an embodiment of the present invention.

FIG. 10 is a diagram for explaining a method of selecting an optimal image. A hatched portion of FIG. 10 indicates a subject image formed on imaging elements. At time 1, subject images 1001*a* and 1001*b* are formed in an image capture region 1000*a* of the second imaging system and an imaging region 1000*b* of the first imaging system, respectively. The subject is assumed to be present on the center line of the second imaging system. In this case, due to a parallax, the subject image 1001*b* is formed at a location deviated by $\Delta$ on the imaging region 1000*b*.

The images in the respective imaging regions are transferred and stored as two-dimensional data into the image memory 103. When an upper left point of each image region is assumed to be an origin and a location of a subject image is represented by coordinates, the upper left coordinates of the subject image 1001*a* are (ax, ay), and the upper left coordinates of the subject image 1001*b* are deviated by a parallax $\Delta$, i.e., is (ax+$\Delta$, ay).

Next, the second imaging region and the first imaging region at time 2 are indicated by 1002*a* and 1002*b*, respectively, and subject images at this time are indicated by 1003*a* and 1003*b*. The first imaging system is shifted to the right by 0.5 pixels using a pixel shift means. The subject image 1003*a* is formed at a location deviated by (bx, by) from the origin in the imaging region 1002*a*.

If it is assumed that there is no motion of the subject, the deviation amount is due to an apparatus shake. The images in the respective image regions are transferred to an image memory, and are represented by coordinates. The upper left coordinates of the subject image 1003a are (ax+bx, ay+by). Since the imaging region 1002b is pixel-shifted, the coordinate origin is shifted to the right by 0.5 pixels. Therefore, as compared to the imaging region 1002a of the second imaging system, the coordinate origin is closer to the subject image 1003b by 0.5 pixels in the imaging region 1002b of the first imaging system. Also, as is similar to time 1, the subject image 1003b is deviated to the right side by the parallax $\Delta$. Therefore, the upper left coordinates of the subject image 1003b are (ax+bx+$\Delta$−0.5, ay+by).

Figures 11, 12:
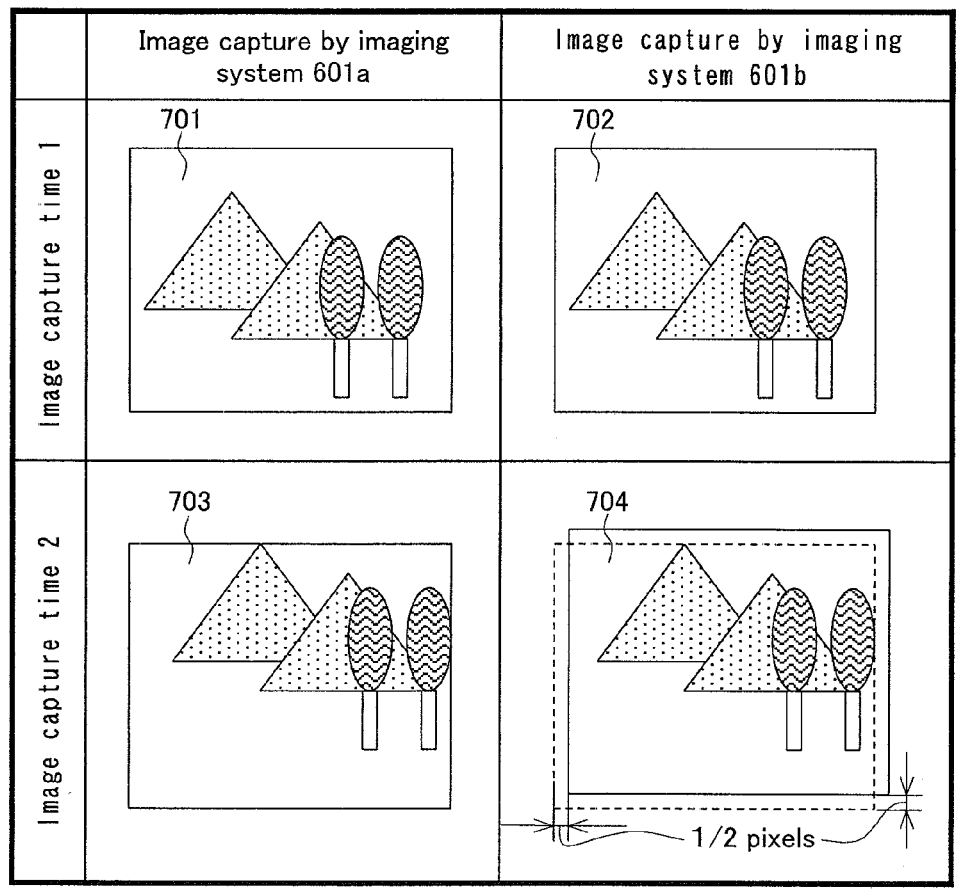
FIG. 11 is a diagram for explaining another method of selecting an optimal image according to an embodiment of the present invention.
FIG. 12 is a diagram illustrating an image which is pixel-shifted once and is stored into an image memory in Example 2 of the present invention.

FIG. 11 is another diagram for explaining the optimal image selecting method. The deviation amount bx and the parallax amount $\Delta$ can be categorized into the case where they are close to an integer pitch and the case where they are close to a value obtained by adding a 0.5-pixel pitch to an integer pitch. If the deviation amount bx and the parallax amount $\Delta$ are represented by values of non-integer pitches, bx=0 and $\Delta$=0 in the case of an integer pitch, and bx=0.5 and $\Delta$=0.5 in the case of a value obtained by adding a 0.5-pixel pitch to an integer pitch.

In FIG. 11, bx and $\Delta$ indicate non-integer pitch values. Regarding values in FIG. 11, the value of each X coordinate of a subject is calculated, assuming that the X coordinate value ax (reference) of the imaging region 1000a is 0. In FIG. 11, a portion indicated by 0 indicates that a positional relationship between a pixel of an imaging element that converts a subject into an image, and the subject, is deviated by an integer pitch, as compared to the imaging region 1000a as a reference. A portion indicated by 0.5 indicates a deviation by a 0.5-pixel pitch. An image corresponding to a portion indicated by 0.5 is an image for which an invalid portion can be utilized effectively.

Here, as can be seen from FIG. 11, there is an image having a calculated X coordinate value of 0.5 of the four images in all combinations of the parallax amount $\Delta$ and the apparatus shake amount bx. Therefore, in all the combinations, an image for which an invalid portion can be effectively utilized can be obtained. In other words, the resolution can be improved irrespective of the apparatus shake and the distance to a subject.

Note that neither the apparatus shake amount nor the parallax amount varies digitally in units of 0.5 pixels, and actually, vary gradually continuously. Therefore, a portion of FIG. 11 in which the values of bx and $\Delta$ are 0.5 may include the case where the value is close to 0.5 (e.g., a value of 0.3 to 0.7). Also, a portion in which the value is 0 may include the case where the value is close to 0 (e.g., a value less than 0.3, and a value more than 0.7). On the other hand, image data needs to be provided on a grid. Therefore, when images are superposed and combined, a linear interpolation process or the like may be performed.

Although, in this embodiment, an optimal image is selected using a horizontal direction pixel pitch of an imaging element as a reference, a pixel pitch in a slanting direction may be used as a reference. Also, a plurality of pixel pitch references may coexist, depending on the situation.

EXAMPLE 2

Hereinafter, Example 2 according to Embodiment 2 will be described. An outer-appearance configuration of Example 2 is similar to that of FIG. 6 of Example 1. An optical system and a pixel shift mechanism of Example 2 are also similar to those of Example 1. Overlapping portions will not be described.

Example 2 is different from Example 1 in that the imaging element 603 performs exposure and transfers an image at substantially the same time, and the drive amount of the pixel shift mechanism is fixed.

An optical glass BK7 (602 in FIG. 6) having a thickness of 500 μm is provided, as a first imaging system which performs pixel shift, on the optical axis of the lens 601b. By tilting optical glass BK7 by about 0.4 degrees using a piezoelectric actuator and a tilting mechanism, a subject image is pixel-shifted by ½ (1.2 μm) of a pixel pitch in the horizontal direction (X-axis direction), thereby doubling the number of pixels.

FIG. 12 illustrates an image that is pixel-shifted once with this configuration, and is stored into an image memory. The time when a first image is captured is referred to as image capture time 1, and time when a second image is captured after pixel shift (after the glass plate is tilted) is referred to as image capture time 2.

In this example, a scene in which the motion of a subject is sufficiently small (e.g., a landscape, etc.) was captured. Therefore, there is not a subject shake between an image 701 captured at the image capture time 1 and an image 703 captured at image capture time 2. When there is a shake, the shake is an apparatus shake that causes the whole image to be shifted between the different times 1 and 2.

Therefore, assuming that the whole image is uniformly shifted, the image 701 captured at the image capture time 1 by the second image capture system which does not perform pixel shift was compared with the image 703 captured at the image capture time 2 by the second imaging system, to obtain an apparatus shake amount. More specifically, it was evaluated to what region of the image 703 a middle portion (e.g., a region of 100×100 pixels) of the image 701 was shifted, using an image comparing method employing (expression 1), to obtain an apparatus shake amount. As a result, a shake amount was 2.2 pixels in an upward direction and 2.5 pixels in a side direction on the screen.

In this case, the shake amount of 2.2 pixels in the upward direction on the screen has a non-integer pitch value by of 0.2 pixels, so that by can be assumed to be 0. The shake amount of 2.5 pixels in the side direction on the screen has a non-integer pitch value bx of 0.5 pixels, so that bx=0.5.

Note that the size of regions to be compared is not limited to squares, and may be set arbitrarily.

Also, a parallax amount obtaining means is used to obtain a parallax amount from the image 701 and the image 702 captured at the image capture time 1. As a result, since the distance to the subject is large, the parallax amount is smaller than or equal to 0.1 pixels in any region of the image, i.e., it can be assumed that $\Delta$=0. In other words, the distribution of the parallax amount is negligible and the whole parallax can be assumed to be uniform.

Based on these shake and parallax amounts, an optimal image selecting means is used to select images to be combined. The above-described result corresponds to a portion of $\Delta$=0 and bx=0.5 in FIG. 11. The optimal image selecting means selects a combination of images corresponding to the portions of 0 and the portion of 0.5 in the column of $\Delta$=0 and bx=0.5 in FIG. 11.

In this case, since three images have a value of 0, a plurality of combinations can be selected. In the case where there is a plurality of combinations, if a combination of the same time is selected, a shake of a subject is reduced, resulting in a high-resolution image.

Although in the example of FIG. 11 the case where the non-integer pitch value by of a shake amount in the Y-axis direction is assumed to be by =0 has been described, by may be assumed to be 0.5. In this case, an image contributing to an improvement in the resolution is an image captured at a position corresponding to an invalid portion under an optical-to-electrical conversion portion, or an image captured at a position corresponding to an invalid portion on a right side of and under an optical-to-electrical conversion portion.

Although, in this example, a method of tilting the glass plate is used as the pixel shift means, the pixel shift means is not limited to this method. For example, an actuator employing a piezoelectric element, an electromagnetic actuator, or the like may be used to physically move the imaging element or the lens in a predetermined amount.

Although, in this example, one imaging element is divided into two regions, two different imaging elements may be employed for the respective optical systems in one-to-one correspondence. Any form of imaging element may be used as long as a plurality of imaging regions correspond to respective optical systems in one-to-one correspondence.

EXAMPLE 3

This example is different from Example 2 in that there is a shift amount of a subject whose image is to be captured (e.g., a human, an animal, etc.). In this example, a scene is captured in which a subject moves to another place during a time from capturing of a first image until the data is stored into a memory and a second image is captured, so that a portion of the subject moves to another place between the first image and the second image.

Example 3 has a basic configuration similar to that of Example 2, and overlapping portions will not be described. When a subject moves, the whole image is not uniformly shifted, so that the shift of the whole image cannot be estimated from a partial region of the image, which is different from Example 2.

Therefore, in Example 3, a block dividing means is provided for dividing an image into a plurality of blocks, and a shake amount is obtained for each block. The block dividing means is controlled by the system control means 100, and divides a whole first image captured by the second imaging system 106a that does not perform pixel shift into blocks having 10×10 pixels. The shake amount obtaining means 104 examines to what position in a second image each block of the divided image corresponds. The shift amount of an image was obtained using (expression 1).

FIG. 13 illustrates images captured in time series using the second imaging system 106a that does not perform pixel shift, the images being stored in an image memory, in this example. FIG. 13A illustrates an image captured at the image capture time 1. FIG. 13B illustrates an image captured at the image capture time 2. FIG. 13C illustrates a shift amount of an image obtained for each block.

In FIG. 13C, A indicates a block for which a shake of 10.1 pixels in the right direction was obtained in FIG. 13A, and B indicates a block in which a shake of 8.8 pixels in the left direction was obtained in FIG. 13A. In the shake amount, an apparatus shake and a motion of a subject are added together.

Similarly, also regarding parallax, an image can be divided into blocks, and a parallax can be obtained for each block. Of combinations of these shake amount and parallax amount, images having an arrangement of an integer pitch (or close to an integer pitch) and images having an arrangement of a 0.5-pixel pitch (or close to a 0.5-pixel pitch) are selected as in Example 2, thereby making it possible to select images that improve the resolution when they are combined.

Thus, by combining an optimal image selected for each block, even when a shift of a subject is large, the resolution can be improved throughout an image.

Note that image processing may be performed in accordance with the selection by the user so that only an apparatus shake is corrected and a subject shake is intentionally not corrected, thereby making it possible to provide a correction mode in which the dynamism of a scene having a motion is emphasized.

Also, when a subject moves, there may be an occluded portion of a subject in images captured in time series (a block indicated with x in FIG. 13C). In such a case, only for this portion, a plurality of images are not combined and only an image captured at a specific time is selected, thereby making it possible to obtain a natural image.

Since the pixel shift technique is a technique for improving the resolution, the technique does not have an effect for a smooth surface of a subject to be captured, and a fine pattern exceeding the resolution performance of a lens. On the other hand, in the case of pixel shift, by reducing a time between each image capture, an apparatus shake and a subject shake are reduced, thereby improving the resolution.

Therefore, an image divided into blocks is analyzed. When there is no effect of pixel shift for the image, the block is not processed, thereby making it possible to reduce the image capture interval. In general, if a high-resolution portion is Fourier-transformed, a large amount of high frequency components are found. Therefore, after an image is taken in and is divided into blocks, frequency components of the image are analyzed. If the frequency component of a portion is lower than or equal to a predetermined condition, the obtaining of a shake amount and the calculation of a parallax may be canceled for the portion.

The interval between each image capture includes a time for exposure, and a time for transferring an image from an imaging element to an image memory. Since the exposure is performed by one operation, the exposure cannot be omitted. A process time for transfer to the image memory can be reduced by handling only required blocks.

EXAMPLE 4

This example is different from Example 3 in that a subject discriminating means for discriminating different subjects in an image is provided. By using the subject discriminating means, a shake amount can be obtained for each subject. Therefore, even when there are different shake amounts in an image (e.g., when there is a subject shake as well as an apparatus shake), the shake amounts can be obtained correctly.

Also, when an image is divided into blocks to obtain shake amounts as in Example 3, division into blocks can be performed for each subject or a size of a block can be changed for each subject. Also, when images are combined, images may be combined selectively only for a specific subject.

Examples of the subject discriminating means include a means for measuring a distance to a subject using radio wave to identify different image regions, a means for performing edge detection or the like using image processing to discriminate different subjects, a method for extracting a subject from an image using a parallax amount, and the like. The subject discriminating means is not limited to these. Any specific means can be used as long as different subjects in an image can be discriminated. Example 4 has a basic configuration similar to that of Example 2, and overlapping portions will not be described.

FIG. 14 is a diagram illustrating a captured image and subject groups discriminated by the subject discriminating means in this example. In this example, the captured image was divided into blocks having 10×10 pixels (11 (width)×9 (length)), and a distance to a subject was measured using radio wave for each block to discriminate different subjects. In the subject discrimination, subjects having a measured distance within a certain error range were discriminated as the same subject. In this example, the error range was 5%.

Figure 14A:
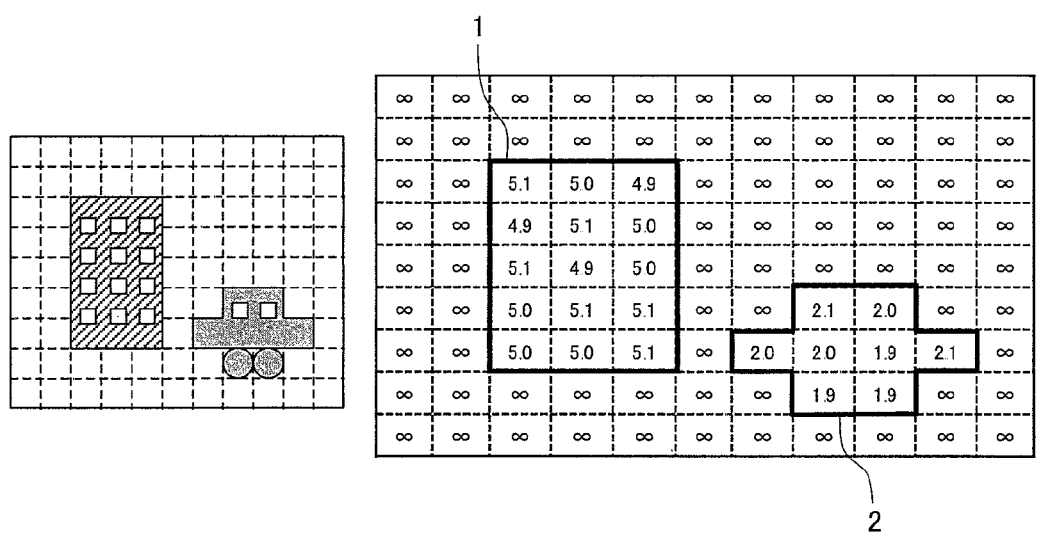
FIG. 14 is a diagram illustrating a captured image and subject groups discriminated by a subject discriminating means in Example 3 of the present invention.
Figure 14B:
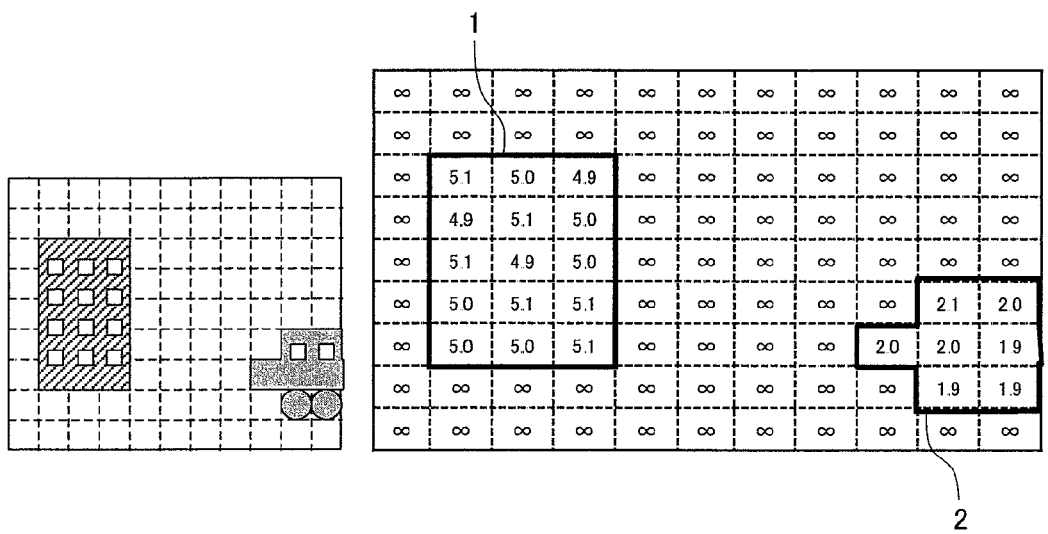

FIG. 14A illustrates an image captured using the second imaging system 106a at the image capture time 1, without using pixel shift. FIG. 14B illustrates an image captured using the second imaging system 106a at the image capture time 2, without using pixel shift. Also, a distance (unit: meter) measured using radio wave is indicated for each block. Regarding this distance, a distance A may be calculated for each block in accordance with (expression 1), using a parallax Δ obtained for each block.

Before performing image capture at the image capture time 1, a distance to a subject was measured using radio wave. As a result, as illustrated in FIG. 14A, two subject groups were discriminated roughly. One is a subject group 1 at a distance of about 5 meters, and the other is a subject group 2 at a distance of about 2 meters. Each subject group is discriminated as falling within the above-described error range of 5%.

Before performing image capture at the image capture time 2, a distance to a subject was measured using radio wave. As a result, subject groups were discriminated as illustrated in FIG. 14B. In this example, shake amounts before and after pixel shift were obtained for each subject group.

By using the shake amount obtaining means, a shake amount was obtained for each subject group. As a result, regarding the subject group 1, a shake of a 10.3-pixel pitch in the left direction was obtained in FIG. 14. This shake is illustrated as a 1-block shake in FIG. 14. Regarding the subject group 2, there is a large subject shake, and a portion of the subject group 2 is out of the image, so that the shake amount of the whole subject group was not able to be correctly obtained.

Therefore, in this example, in the image captured at the image capture time 2, only the subject group 1 was subjected to shake correction before image combination. A method of selecting images using the optimal image selecting means was similar to that of Example 2.

More specifically, the value bx which is the non-integer portion of the shake of the 10.3-pixel pitch of the subject group 1 is 0.3 pixels, and bx of FIG. 11 can be assumed to be bx=0.5.

Note that, since the subject group 1 is shifted in the left direction, the value of bx can be a negative value of −0.5. In this case, 0.5 in Table 11 is −0.5. When Δ=0 and bx=−0.5, the value of ax+bx+Δ−0.5 is −1. This is an integer pitch and is therefore 0, which is the same as that when bx=0.5.

Specifically, bx takes a positive or negative value, depending on whether an invalid pixel that is effectively utilized is positioned on a right or left side of an optical-to-electrical conversion portion. In either case, the contribution to the resolution is the same.

As in this example, by discriminating different subjects using the subject discriminating means, a shake amount can be obtained for each subject, thereby making it possible to correct a shake amount of an image accurately.

Also, when a portion of an image is out of an image capture range due to an apparatus shake and a subject shake so that the image cannot be recognized, the improvement of the resolution due to pixel shift is not performed in the image region, and one of a plurality of captured images may be selected.

EXAMPLE 5

Figure 15:
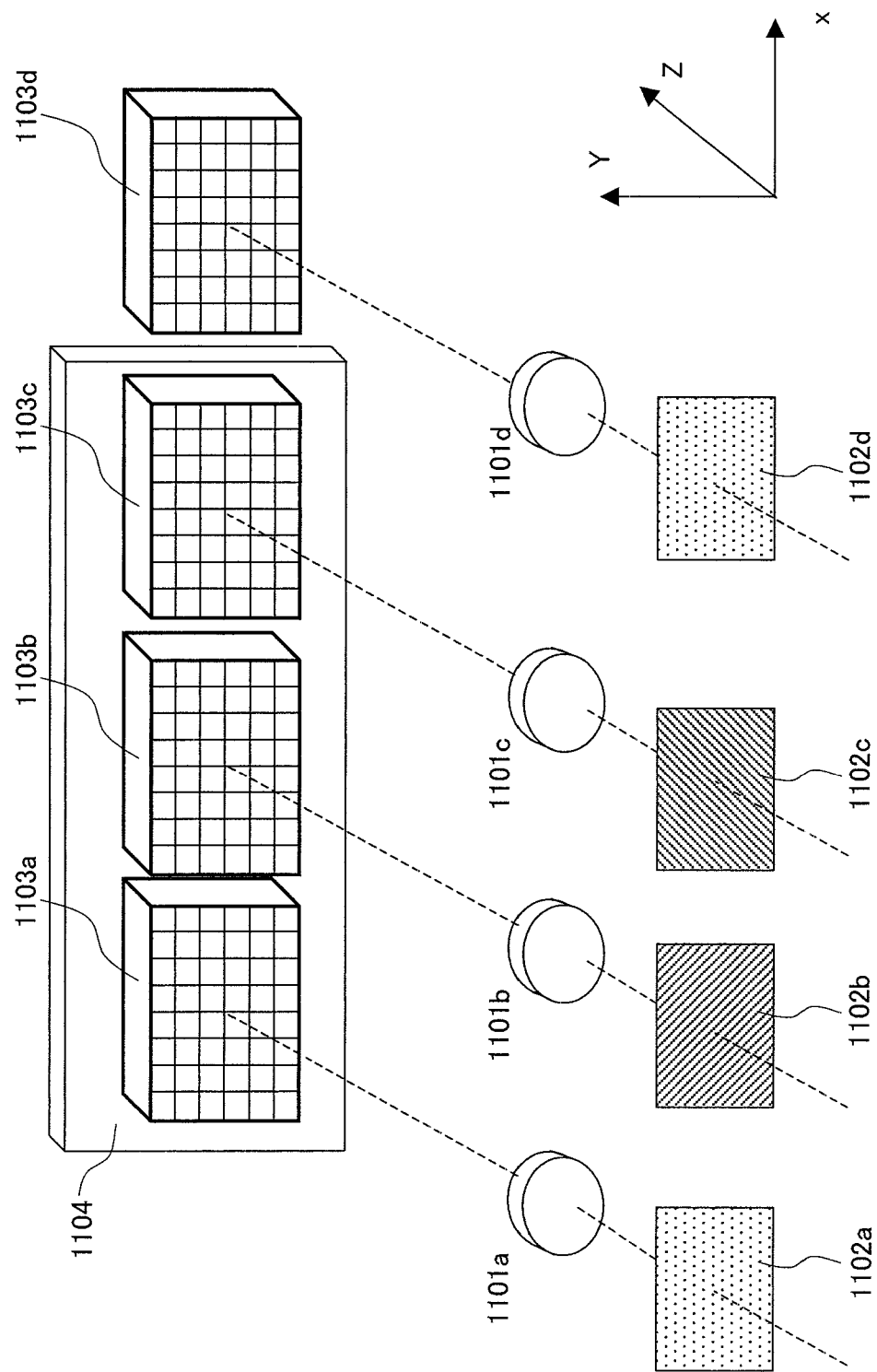
FIG. 15 is a diagram illustrating a configuration of an imaging system, a pixel shift means, and an imaging element according to Example 5 of the present invention.

FIG. 15 illustrates a configuration of an imaging system, a pixel shift means, and an imaging element according to this example. As imaging optical systems, aspherical lenses 1101a to 1101d each having a diameter of 2 mm are used. Each lens has an optical axis substantially parallel to a Z axis in FIG. 15. An interval between each optical axis is 2.5 mm. Color filters 1102a to 1102d are provided before the respective lenses (on the subject side) as wavelength separating means that transmit only specific wavelengths. 1102a and 1102d indicate color filters which transmit a green color, 1102b indicates a color filter which transmits a red color, and 1102c indicates a color filter which transmits a blue color.

1103a to 1103d indicate four imaging elements corresponding to the respective lenses in one-to-one correspondence, and are operated in synchronization with each other using a common drive circuit. By combining images captured by the optical systems (color components), a color image can be obtained. The imaging element has a pixel pitch of 3 μm in this example.

The lens and the imaging elements are each provided parallel to an X axis in FIG. 15 and are equally spaced, and each imaging element has a light receiving surface parallel to the XY plane in FIG. 15.

1104 indicates a piezoelectric small movement mechanism that serves as a pixel shift means. As a first imaging system which performs pixel shift, the imaging elements 1103a to 1103c are attached to the piezoelectric small movement mechanism 1104 so that the imaging elements 1103a to 1103c are driven in the X direction and the Y direction in FIG. 15. 1103d is separated from the piezoelectric small movement mechanism, and serves as a second imaging system which does not perform pixel shift.

Figure 16:
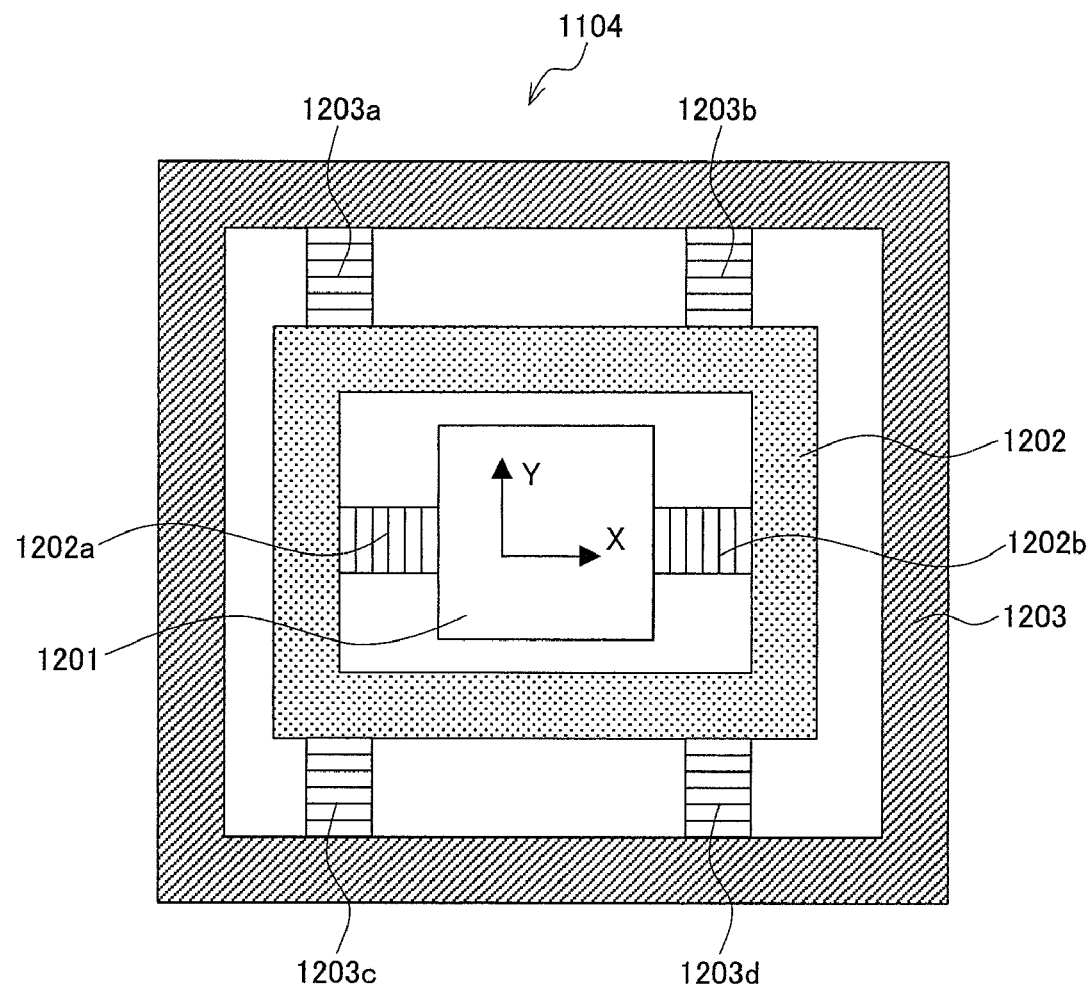
FIG. 16 is a plane figure of a piezoelectric small movement mechanism according to an embodiment of the present invention.

FIG. 16 is a plan view of the piezoelectric small movement mechanism 1104. The imaging elements 1103a to 1103c are provided on a stage 1201 at a center portion. The stage 1201 is moved finely in the X-axis direction of FIG. 15 using laminated piezoelectric elements 1202a and 1202b, and a stage fixing frame 1202 is moved finely in the Y-axis direction of FIG. 15 using laminated piezoelectric elements 1203a to 1203d. Thereby, the imaging element can be moved finely separately in two axial directions orthogonal to each other in a horizontal plane of the imaging element.

In this example, by one image capture command, four images were captured for each imaging element while performing pixel shift. By performing image capture once, four images corresponding to the four imaging elements 1103a to 1103d were obtained. The three imaging elements 1103a to 1103c were configured to perform image capture while being shifted by a 0.5-pixel pitch (1.5 μm) in each of the X direction and the Y direction. Specifically, first image capture was performed without pixel shift. The imaging elements 1103a to 1103c were shifted by a 0.5-pixel pitch in the X direction before second image capture was performed. Next, the imaging elements 1103a to 1103c were shifted by a 0.5-pixel pitch in the Y direction while keeping the X-direction position before third image capture was performed. Finally, the imaging elements 1103a to 1103c were moved by a −0.5-pixel pitch in the X direction while keeping the Y-direction position before fourth image capture was performed. By combining these four images, a high-resolution image was obtained.

Initially, from a plurality of images captured in time series using the lens 1101d of the second imaging system that does not perform pixel shift, shake amounts at respective image capture times were obtained. Also, a parallax amount obtaining means was used to obtain a parallax amount from the first image captured by the first imaging system having the attached green color filter 1102a and the second imaging system having the attached green color filter 1102d. This is because it is easier to compare images captured using the same color filter, and a parallax amount can be obtained with higher precision.

Next, based on the obtained shake amount and parallax amount, images to be combined were selected using an optimal image selecting means, and images of each color were combined. In order to generate a color image, luminance data of three primary colors is required in each pixel. Green image data is included in both the first imaging system and the second imaging system, thereby making it possible to improve the resolution.

On the other hand, for the red-color and blue-color images, there is not an image which is captured without pixel shift, so that an image shifted by 0.5 pixels (an invalid portion is utilized) is not obtained, depending on a shake amount or a parallax amount, and therefore, the resolution may not be improved.

However, in general, human eyes receive more pieces of information about a green color. Therefore, even if the blue and red resolutions are lower than the green resolution, there is a less influence when image capture is performed with respect to natural landscapes, humans, and the like. Also, it is known that a green color image and red and blue color images have a strong correlation in a local region of an image. It is possible to utilize this property to estimate blue and red images to be interpolated, from a green image.

If an imaging optical system that does not perform pixel shift is provided for each of all green, red and blue colors, images shifted by 0.5 pixels for which invalid portions can be utilized can be included in images selected by the optimal image selecting means with certainty, thereby reliably obtaining a high-resolution image.

Figure 17A:
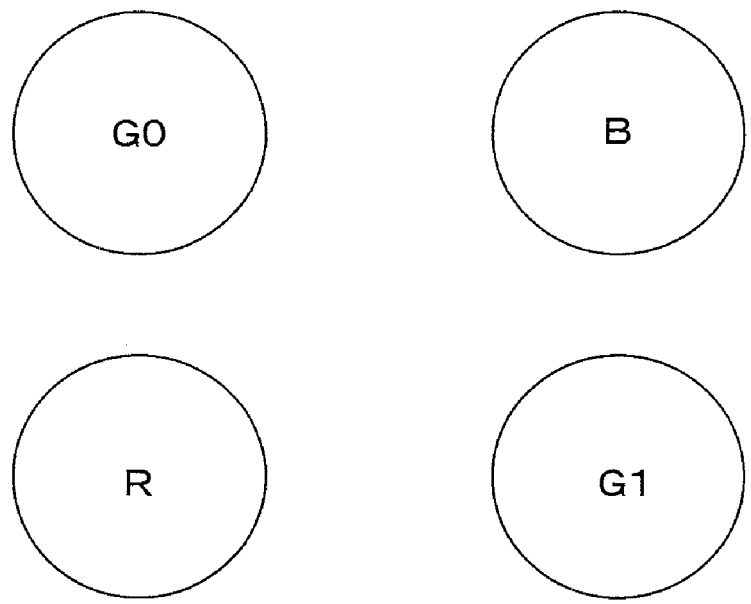
FIG. 17 is a diagram illustrating an exemplary arrangement of optical systems according to an embodiment of the present invention.

Although, in this example, four optical systems are provided on a single straight line, the arrangement is not limited to this. FIG. 17 illustrates another exemplary arrangement of four optical systems. FIG. 17A illustrates an example in which four optical systems are provided at the vertices of a rectangle. G0 and G1 indicate green wavelength separating means (color filters), R indicates a red wavelength separating means (color filter), and B indicates a blue wavelength separating means (color filter).

Figure 17B:
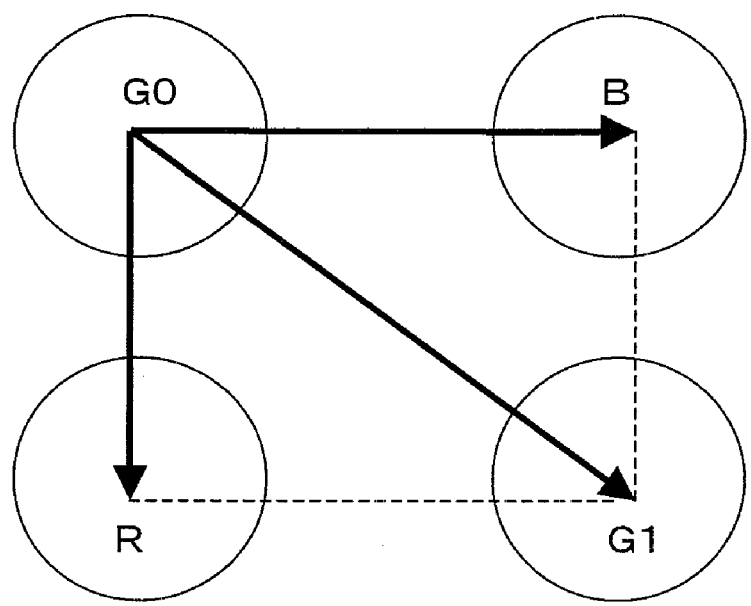

FIG. 17B is a diagram for explaining obtaining of a parallax amount in the arrangement of FIG. 17A. For obtaining a parallax amount, the green imaging systems that are diagonally provided are used. Parallaxes of the other red-color and blue-color imaging systems are orthogonal components of the parallax amount of the green imaging system since the four optical systems are provided at the vertices of the rectangle.

Although, in this example, the color filter is provided before the lens to separate a wavelength, the color filter may be provided between the lens and the imaging element, or the color filter may be formed directly on the lens.

The color filters are not necessarily limited to the three primary colors R, G and B. Complementary color filters may be used to separate wavelengths, and color information may be reversed and combined by image processing.

The wavelength separating means is not limited to color filters. For example, when a glass plate is used as the pixel shift means and a mechanism of tilting the glass plate is used, a colored glass may be used as the glass plate. Thus, any specific means may be used as the wavelength separating means as long as it is a means for separating a predetermined wavelength component.

Although it has been described as an example that images captured by the optical system handling a green color are compared to obtain parallax and shake amounts, the color is not necessarily limited to green. The same-color wavelength separating means are provided to the first imaging system and the second imaging system, thereby making it possible to obtain a similar effect.

Embodiment 3

Figure 18:
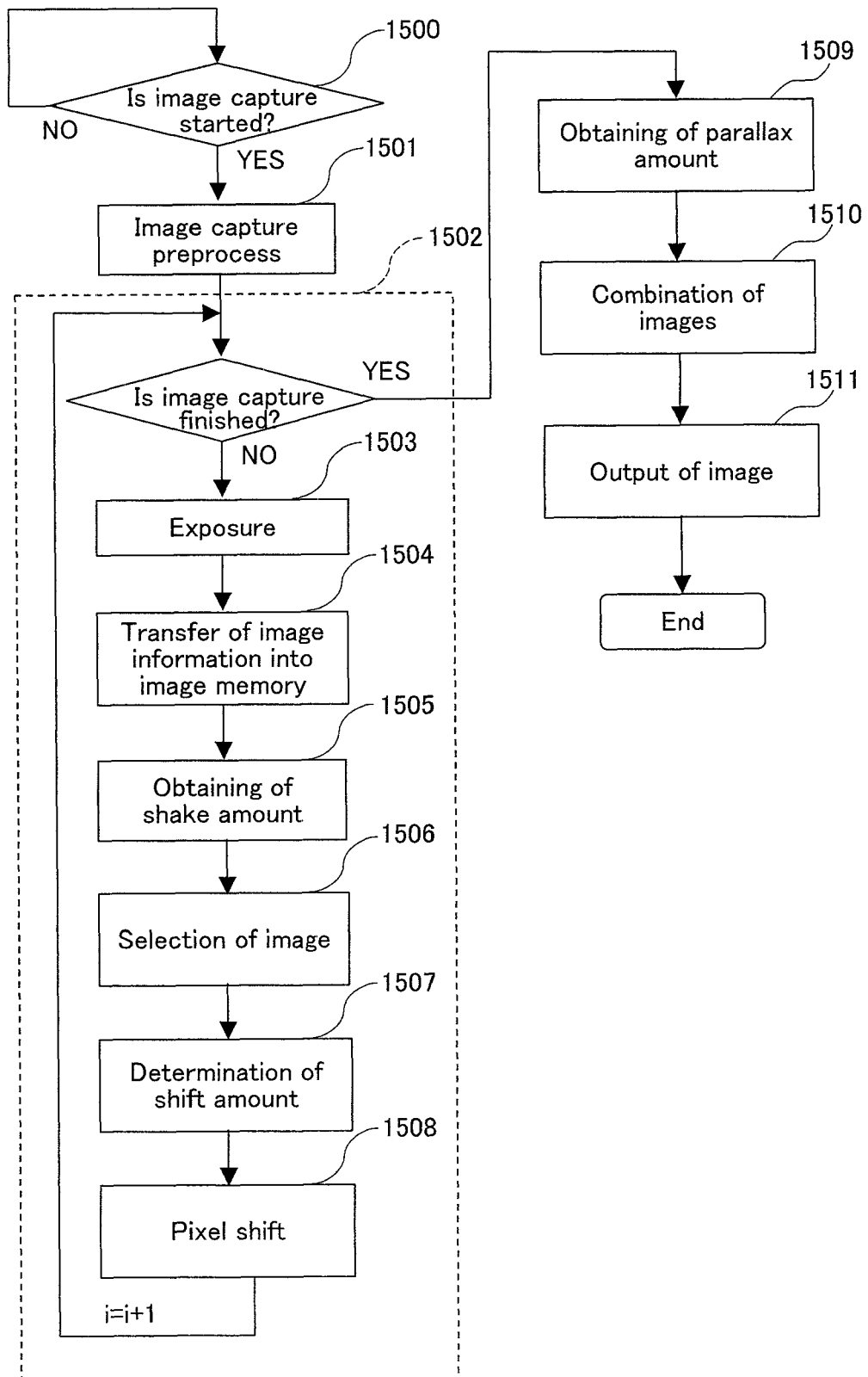
FIG. 18 is a flowchart illustrating a whole operation of an imaging apparatus of Embodiment 3 of the present invention.
Figure 19:
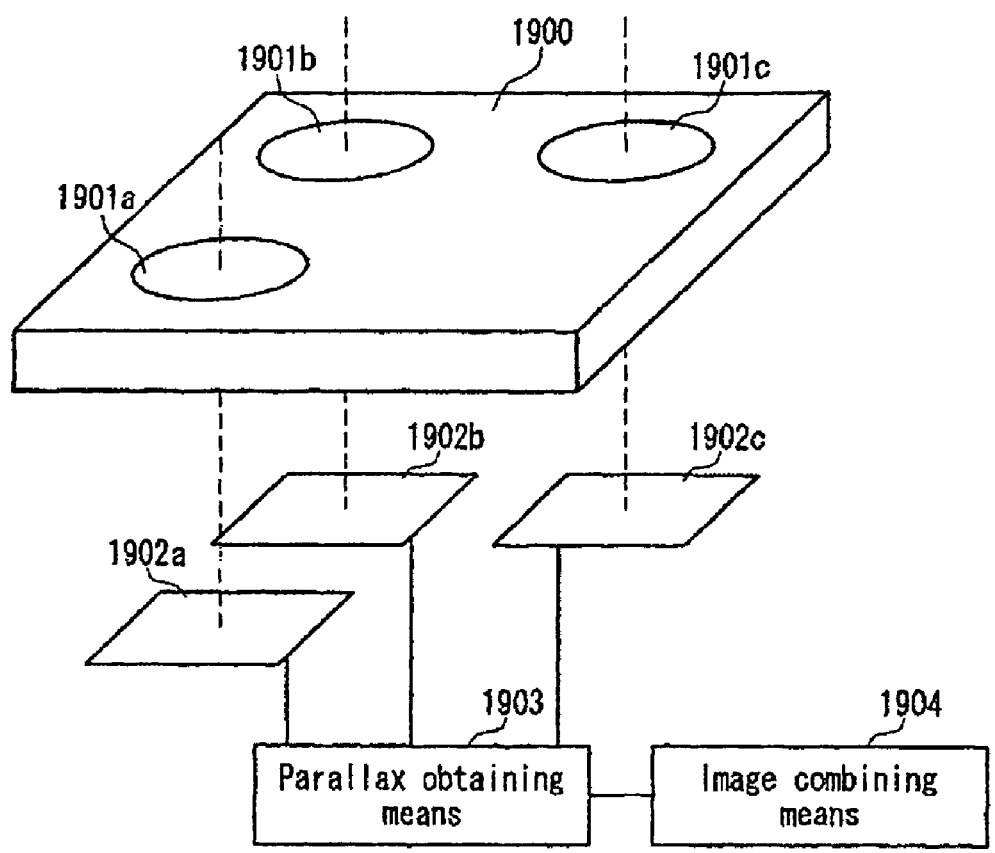
FIG. 19 is a schematic perspective view of a major portion of a conventional multi-eye type imaging apparatus.
Figure 20A:
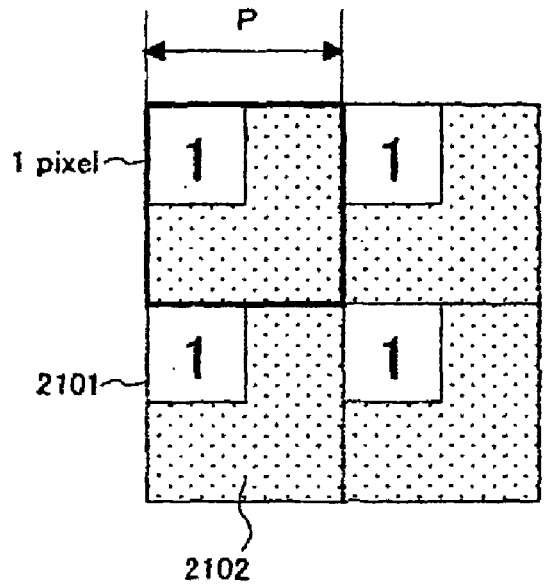
FIG. 20 is a conceptual diagram for explaining how to improve a resolution using a conventional pixel shift technique.
Figure 20B:
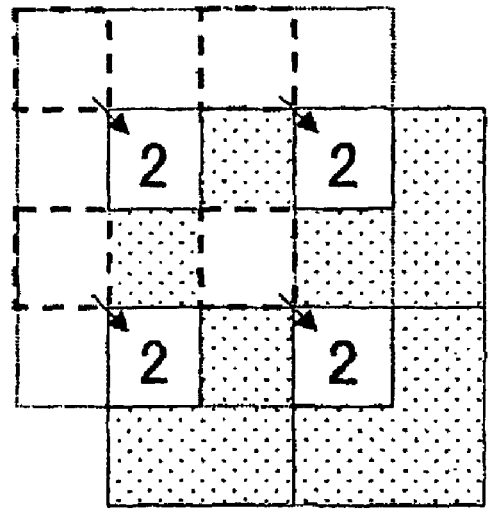
Figure 20C:
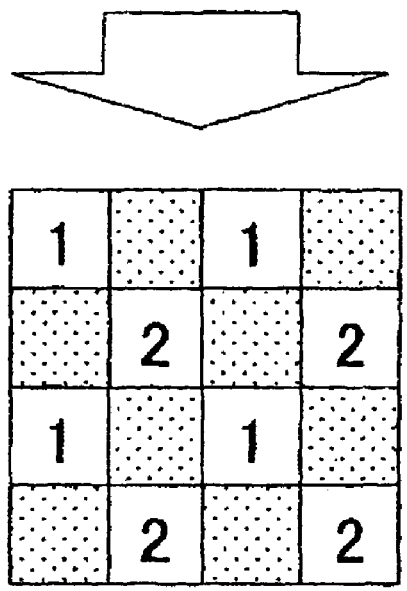

FIG. 18 is a flowchart illustrating a whole operation of an imaging apparatus according to Embodiment 3. Embodiment 2 is configured to determine a pixel shift operating method before performing image capture a predetermined number of times. Embodiment 3 is configured to change the number of times of image capture, depending on the captured image.

In FIG. 18, steps 1500, 1501, 1503 and 1504 are similar to steps 200, 201, 801 and 802 of FIG. 8. The following steps of FIG. 18 are different from those of FIG. 8. In the flowchart of FIG. 18, in step 1502 in which pixel shift and image capture are performed repeatedly, a shake amount is obtained in step 1505 and images to be combined are selected in step 1506.

A plurality of images shifted by a 0.5-pixel pitch which are required for combination are obtained by performing image capture once, depending on a shake amount and a parallax amount. Therefore, if a pixel shift operation determined before image capture is performed, images having the same positional relationship are taken in, i.e., images that do not contribute to the improvement of resolution are taken in.

Therefore, after images are selected in step 1506, an image that is required but absent for combination is found, and a shift amount is determined so as to obtain the image in step 1507, and pixel shift is performed in step 1508.

A series of steps in step 1502 are performed repeatedly until images required for combination are obtained before the end of step 1502. Thereafter, in step 1509, a parallax amount is obtained. In step 1510, images accumulated in an image memory are combined. The resultant image is output in step 1511. Image capture is ended.

With such a process, the number of times of pixel shift can be reduced, so that an influence of an apparatus shake or a motion of a subject can be minimized, thereby making it possible to obtain a higher-resolution image.

INDUSTRIAL APPLICABILITY

As described above, according to the present invention, even if there is an apparatus shake or a subject shake when pixel shift is performed, it is possible to reduce a reduction in effect of pixel shift, and obtain a high-resolution image. Therefore, the present invention is useful for, for example, an imaging apparatus used in a digital still camera, a mobile telephone, or the like.

The invention claimed is:
1. A multi-eye imaging apparatus comprising:
a plurality of imaging systems including a first imaging system and a second imaging system, each imaging system including an optical system and an imaging element and having a different optical axis, wherein
the first imaging system includes a shifter that moves at least one part of the first imaging system in a fixed amount to change a relative positional relationship between an image formed on the imaging element of the first imaging system and the imaging element of the first imaging system, during a time-series image capture, and a relative positional relationship among parts of the second imaging system is fixed during the time-series image capture;

an image memory that accumulates a plurality of frames of image information captured in the time series from the first and second imaging systems;

a shake amount obtaining unit that obtains a shake amount by comparing the plurality of frames of image information in the image memory, captured in the time series by from the second imaging system, wherein the shifter moves at least one part of the first imaging system in the fixed amount independent of the shake amount;

a parallax amount obtaining unit that obtains a magnitude of a parallax from images in the image memory, captured by the first and second imaging systems, an optimal image selecting unit that selects a combination of image information from the plurality of frames of image information in the image memory, captured in the time series from the first imaging system and the second imaging system, so that a resolution of a combined image information is higher than that of each of the plurality of frames of image information, the selected combination of image information based on the fixed amount for the shifter, the shake amount obtained by the shake amount obtaining unit, and the parallax amount obtained b the parallax obtaining unit; and an image combining unit configured to combine the selected combination of image information.

2. The multi-eye imaging apparatus according to claim 1, wherein the image combining unit corrects and combines the images based on the parallax amount obtained by the parallax amount obtaining unit and the shake amount obtained by the shake amount obtaining unit.

3. The multi-eye imaging apparatus according to claim 1, further comprising:

a discrimination unit for discriminating different subjects, wherein the shake amount obtaining unit obtains a shake amount for each of the different subjects, and the image combining unit combines images for each of the different subjects.

4. The multi-eye imaging apparatus according to claim 1, further comprising:

a division unit for dividing image information into a plurality of blocks, wherein the shake amount obtaining unit obtains a shake amount for each of the plurality of blocks, and the image combining unit combines images for each of the plurality of blocks.

5. The multi-eye imaging apparatus according to claim 1, wherein the plurality of imaging systems having the different optical axes are composed of: an imaging system for handling a red color; an imaging system for handling a green color; and an imaging system for handling a blue color, wherein, for at least one corresponding to one color of the imaging systems corresponding to the respective colors, the number of the imaging systems corresponding to the one color is two or more, and the two or more imaging systems for handling the one color include the first imaging system and the second imaging system.

6. A method for capturing images with a multi-eye imaging apparatus comprising a plurality of imaging systems including a first imaging system and a second imaging system, each imaging system including an optical system and an imaging element and having a different optical axis, the imaging method comprising:

capturing images from the first imaging system and the second imaging system at a first time, moving at least one part of the first imaging system from a position at the first time in a fixed amount, to change a relative positional relationship between an image formed on the imaging element of the first imaging system and the imaging element of the first imaging system, with a relative positional relationship among parts of the second imaging system fixed, capturing images from the first imaging system and the second imaging system at a second time, subsequent to the moving, obtaining a shake amount from images captured from the second imaging system at the first time and the second time, obtaining a parallax amount from images captured from the first imaging system and the second imaging system at a same time, selecting a combination of images from the plurality of images captured from the first imaging system and the second imaging system at the first time and the second time, so that a resolution of a combined image is higher than that of each of the plurality of images, based on the fixed amount for the moving and the shake amount and the parallax amount, and combining the selected combination of images.

* * * * *